(12) United States Patent
Kosugi et al.

(10) Patent No.: US 10,120,710 B2
(45) Date of Patent: Nov. 6, 2018

(54) VIRTUALIZED RESOURCE MANAGEMENT NODE AND VIRTUAL MIGRATION METHOD FOR SEAMLESS VIRTUAL MACHINE INTEGRATION

(71) Applicant: NTT DOCOMO, INC., Chiyoda-ku (JP)

(72) Inventors: Masaaki Kosugi, Chiyoda-ku (JP); Hidenori Asaba, Chiyoda-ku (JP); Takeo Yamasaki, Chiyoda-ku (JP); Ashiq Khan, Chiyoda-ku (JP); Shigeru Iwashina, Chiyoda-ku (JP); Takashi Shimizu, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 70 days.

(21) Appl. No.: 15/300,103

(22) PCT Filed: Feb. 17, 2015

(86) PCT No.: PCT/JP2015/054283
§ 371 (c)(1),
(2) Date: Sep. 28, 2016

(87) PCT Pub. No.: WO2015/146374
PCT Pub. Date: Oct. 1, 2015

(65) Prior Publication Data
US 2017/0220371 A1    Aug. 3, 2017

(30) Foreign Application Priority Data
Mar. 28, 2014   (JP) ................................ 2014-068981

(51) Int. Cl.
*G06F 9/455*   (2018.01)
*G06F 9/46*    (2006.01)
(Continued)

(52) U.S. Cl.
CPC ............ *G06F 9/45558* (2013.01); *G06F 9/46* (2013.01); *G06F 9/4856* (2013.01); *G06F 9/50* (2013.01);
(Continued)

(58) Field of Classification Search
None
See application file for complete search history.

(56) References Cited

U.S. PATENT DOCUMENTS 8,429,647 B2 *  4/2013  Zhou ..................... G06F 9/4856
                                                          709/220
2006/0155912 A1 *  7/2006  Singh .................... G06F 9/5088
                                                          711/6

(Continued)

FOREIGN PATENT DOCUMENTS

| JP | 2010-237788 A | 10/2010 |
| JP | 2014-41414 A | 3/2014 |
| WO | WO 2011/158300 A1 | 12/2011 |

OTHER PUBLICATIONS

Office Action dated Feb. 7, 2017 in Japanese Patent Application No. 2016-510124 (with unedited computer generated English translation).

(Continued)

*Primary Examiner* — Gregory A Kessler
(74) *Attorney, Agent, or Firm* — Oblon, McClelland, Maier & Neustadt, L.L.P.

(57) ABSTRACT

A virtual resource management node to seamlessly migrate a virtual machine with less influence on services in an NFV environment. A VIM is a VIM for managing each virtualized resource that is included in an NFV environment including virtualized resources including a physical machine in which a virtual machine having a VNF being a virtualized communication function is implemented, and the VIM includes a switching unit for switching a network flow from a virtual (Continued)

machine of a migration source to a virtual machine of a migration destination, or switching a system between an Active (ACT) system virtual machine of a migration source and a Standby (SBY) system virtual machine of a migration destination.

6 Claims, 26 Drawing Sheets

(51) Int. Cl.
    *G06F 9/50*     (2006.01)
    *G06F 11/20*     (2006.01)
    *H04W 24/04*     (2009.01)
    *H04W 88/14*     (2009.01)
    *H04W 24/02*     (2009.01)
    *G06F 9/48*     (2006.01)

(52) U.S. Cl.
    CPC ............ *G06F 9/5077* (2013.01); *G06F 11/20* (2013.01); *H04W 24/02* (2013.01); *H04W 24/04* (2013.01); *H04W 88/14* (2013.01); *G06F 2009/4557* (2013.01); *G06F 2009/45562* (2013.01)

(56) References Cited

U.S. PATENT DOCUMENTS

| | | |
|---|---|---|
| 2007/0094659 A1 | 4/2007 | Singh et al. |
| 2009/0222815 A1* | 9/2009 | Dake ................. G06F 9/455 718/1 |
| 2010/0058342 A1* | 3/2010 | Machida ............... G06F 9/5077 718/1 |
| 2010/0251255 A1 | 9/2010 | Miyamoto et al. |
| 2011/0208908 A1* | 8/2011 | Chou .................. G06F 11/1662 711/112 |
| 2011/0314193 A1 | 12/2011 | Kaneda et al. |
| 2013/0282887 A1 | 10/2013 | Terayama et al. |

OTHER PUBLICATIONS

International Search Report dated Mar. 31, 2015 in PCT/JP2015/054283, filed Feb. 17, 2015.

Yutaka Ishiakwa et al. "Live Migration of Virtual Machines by Exploiting Layer-7 Protocol Context", IPSJ SIG Technical Report, vol. 2008, No. 77, Aug. 7, 2008, 13 pages (with Partial English Translation).

"Network Functions Virtualisation (NFV); Architectural Framework", ETSI GS NFV 002, V1.1.1, Oct. 2013, 21 pages.

International Preliminary Report on Patentability and Written Opinion dated Oct. 13, 2016 in PCT/JP2015/054283 (submitting English translation only).

Extended European Search Report dated Feb. 24, 2017 in Patent Application No. 15768079.4.

Christopher Clark et al. "Live Migration of Virtual Machines", Proceedings of the Symposium on Networked Systems Design and Implementation, USENIX Association, XP002443245, Jan. 1, 2005, pp. 273-286.

* cited by examiner

*Fig.4*

| VIRTUAL MACHINE ID | MIGRATABLE/NONMIGRATABLE STATE |
|---|---|
| 0001 | MIGRATABLE |
| 0002 | NONMIGRATABLE |
| 0003 | MIGRATABLE |
| ⋮ | ⋮ |
| 9999 | MIGRATABLE |

Fig.5

| No | CONDITION | DESCRIPTION |
|---|---|---|
| 1 | PROVIDING SERVICE | STATE IN WHICH APPLICATION OPERATING WITHIN VIRTUAL MACHINE IS PROVIDING SERVICE. IT IS ASSUMED TO MAKE VIRTUAL MACHINE NONMIGRATABLE FOR AVOIDING GENERATION OF USER INFLUENCE CAUSED BY SWITCHING OR MIGRATION. |
| 2 | STARTING | STATE IN WHICH VIRTUAL MACHINE EXISTS, BUT SERVICE IS IN MIDDLE OF STARTING (IN PREPARATION). IT IS ASSUMED TO MAKE VIRTUAL MACHINE NONMIGRATABLE CONSIDERING TEMPORARY HIGH LOAD APPLIED IN STARTING, OR THE LIKE. |
| 3 | SHUTTING DOWN | STATE IN WHICH VIRTUAL MACHINE EXISTS, BUT SERVICE IS UNDER EXECUTION OF SHUTDOWN PROCEDURE. SINCE GRACEFUL SHUTDOWN IS EXECUTED, IT IS ASSUMED TO MAKE VIRTUAL MACHINE NONMIGRATABLE FOR AVOIDING BEING INFLUENCED BY SWITCHING OR MIGRATION. |
| 4 | UNDER MAINTENANCE | STATE IN WHICH MAINTENANCE PERSONNEL IS CHANGING SERVICE SETTING. IT IS ASSUMED TO MAKE VIRTUAL MACHINE NONMIGRATABLE FOR AVOIDING GENERATION OF UNEXPECTED OPERATION CAUSED BY SWITCHING OR MIGRATION, AND MANAGEMENT STATE CHANGE OF SERVICE SIDE AND VIM SIDE. |
| 5 | UNDER CONGESTION | STATE IN WHICH CONGESTION OCCURS DUE TO HIGH LOAD ON SERVICE. IT IS ASSUMED TO MAKE VIRTUAL MACHINE NONMIGRATABLE FOR AVOIDING FURTHER INCREASE IN LOAD DUE TO INFLUENCE OF SWITCHING OR MIGRATION. |
| 6 | BACKUP ONGOING | STATE IN WHICH SERVICE BACKUP IS ONGOING. IT IS ASSUMED TO MAKE VIRTUAL MACHINE NONMIGRATABLE CONSIDERING MANAGEMENT STATE CHANGE DURING BACKUP AND TEMPORARY DISC ACCESS HIGH LOAD CAUSED BY BACKUP. |
| 7 | UNDER FAILURE | STATE IN WHICH SOME SORT OF FAILURE OCCURS WITHIN VIRTUAL MACHINE. IT IS ASSUMED TO MAKE VIRTUAL MACHINE NONMIGRATABLE FOR KEEPING CURRENT STATE FOR CAUSE INVESTIGATION. |

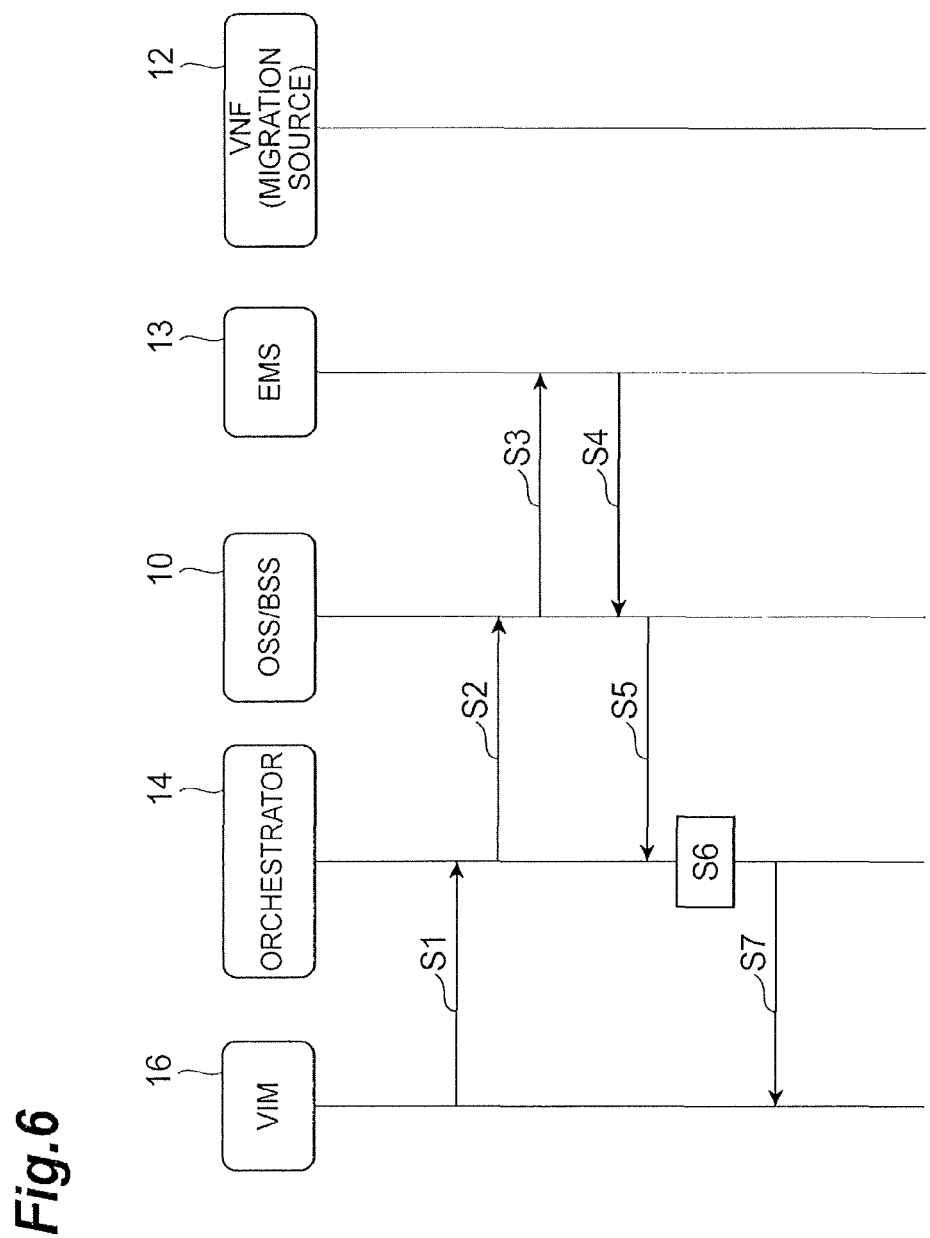

VIRTUALIZED RESOURCE MANAGEMENT NODE AND VIRTUAL MIGRATION METHOD FOR SEAMLESS VIRTUAL MACHINE INTEGRATION

TECHNICAL FIELD

The present invention relates to a virtualized resource management node relating to the migration of a virtual machine, and a virtual machine migration method.

BACKGROUND ART

For various purposes, computers are conventionally set as virtual machines (VMs) by using a server virtualization technology. In addition, it is considered to set a node (core node) in a core network of a mobile communication network, as virtual machine(s) by using the technology (for example, refer to Non Patent Literature 1).

CITATION LIST

Non Patent Literature

Non Patent Literature 1: ETSI Group Specification (ETSI GS NFV 002 v1.1.1 (2013.10)) Network Functions Virtualisation (NFV); Architectural Framework

SUMMARY OF INVENTION

Technical Problem

In a network functions virtualization (NFV) environment disclosed in Non Patent Literature 1 described above, the core node of the mobile communication network is implemented by a virtual network function (VNF), which is a virtualized communication function on virtual machine(s). In addition, the mobile communication network is managed by 3 functional entities: a VNF manager (VNFM), a Virtualized Infrastructure Manager (VIM), and an Orchestrator. The VNFM has a function of managing a VNF. The VIM monitors the status of a physical server (virtualized resource) on which virtual machine(s) is implemented, and generates/deletes the virtual machine(s) and a VNF on the physical server according to the control from the VNFM or the Orchestrator. The Orchestrator performs overall resource management over a plurality of VIMs.

Here, in general cloud services, virtual machine migration is performed for the purpose of migrating a virtual machine to one side for enhancing the use efficiency of virtualized resources, saving a virtual machine in hardware minor failure, increasing resource pool capacity, renewing hardware, and the like. The virtual machine migration is performed by scaling out/in, restarting, live migration, and the like. In some cases, the virtual machine migration may affect services. For example, high-load may be temporarily applied due to the starting/shutdown of the virtual machine and the live migration, and instantaneous interruption may be caused.

Also in the virtualization of communication services implemented in the above-described NFV environment, communication service providers are assumed to execute the virtual machine migration for the above-described reasons. Nevertheless, services provided by the communication service providers basically take no holiday and do not stop for 24 hours throughout 365 days. It is therefore necessary to avoid an operation affecting end users of a service provided on virtual machine(s), such as the shutdown of the virtual machine(s), a high-load state, and instantaneous interruption.

Thus, the present invention has been devised in view of the issues, and the object of the present invention to provide a virtualized resource management node and a virtual machine migration method that can seamlessly migrate a virtual machine with less influence on services in the NFV environment.

Solution to Problem

To solve the above-described issues, a virtualized resource management node according to an aspect of the present invention is a virtualized resource management node for managing each virtualized resource that is included in a communication system including virtualized resources including a physical machine on which virtual machine(s) having a virtual communication function being a virtualized communication function is implemented, and the virtualized resource management node includes a switching means for switching a network flow from a virtual machine of a migration source to a virtual machine of a migration destination, or switching a system between an Active (ACT) system virtual machine of a migration source and a Standby (SBY) system virtual machine of a migration destination.

According to such an apparatus, the switching means switches a network flow from a virtual machine of a migration source to a virtual machine of a migration destination, or switches a system between an ACT system virtual machine of a migration source and a SBY system virtual machine of a migration destination. According to the configuration, switching from a virtual machine of a migration source to a virtual machine of a migration destination, or system switching between an ACT system virtual machine of a migration source and a SBY system virtual machine of a migration destination can be seamlessly performed with less influence on services. In short, a virtual machine can be seamlessly migrated with less influence on services in the NFV environment.

In addition, in the virtualized resource management node according to an aspect of the present invention, an expansion means for adding on a virtual machine of a migration destination may be further included, and the switching means may switch a network flow from the virtual machine of the migration source to the virtual machine of the migration destination that has been added on by the expansion means. According to the configuration, for example, scaling out/in performed through network flow switching can be reliably achieved.

In addition, in the virtualized resource management node according to an aspect of the present invention, an expansion means for adding on a SBY system virtual machine of a migration destination may be further included, and the switching means may switch a system between the ACT system virtual machine of the migration source and the SBY system virtual machine of the migration destination that has been added on by the expansion means. According to the configuration, for example, scaling out/in performed through system switching between the ACT system/SBY system can be reliably achieved.

In addition, in the virtualized resource management node according to an aspect of the present invention, a migration means for migrating a SBY system virtual machine of a migration source to a SBY system virtual machine of a migration destination through live migration may be further included, and the switching means may switch a system between the ACT system virtual machine of the migration source and the SBY system virtual machine of the migration destination that has been migrated by the migration means. According to the configuration, for example, live migration performed through system switching between the ACT system/SBY system can be reliably achieved.

In addition, in the virtualized resource management node according to an aspect of the present invention, the communication system may further include an overall management node for managing all virtualized resources, the virtualized resource management node may further include a migratability acquisition means for transmitting a migration request for requesting migration of a virtual machine, to the overall management node, and receiving, as a response thereto, migratability indicating availability/unavailability of migration of the virtual machine that has been determined in the overall management node based on a predetermined determination criterion, from the overall management node, and the switching means may perform the switching in a case in which the migratability received by the migratability acquisition means indicates that migration is available. According to the configuration, the overall management node for managing all the virtualized resources determines migratability of a virtual machine, and switching is performed in a migratable case. Thus, the virtual machine can be migrated more safely and reliably in the NFV environment.

Meanwhile, aside from being described as an invention of a virtualized resource management node as described above, the present invention can also be described as an invention of a virtual machine migration method as described below. This is substantially the same invention, and brings about similar function and effect though category is different.

More specifically, a virtual machine migration method according to an aspect of the present invention is a virtual machine migration method executed by a virtualized resource management node for managing each virtualized resource that is included in a communication system including virtualized resources including a physical machine on which virtual machine(s) having a virtual communication function being a virtualized communication function is implemented, and the virtual machine migration method includes a switching step of switching a network flow from a virtual machine of a migration source to a virtual machine of a migration destination, or switching a system between an Active (ACT) system virtual machine of a migration source and a Standby (SBY) system virtual machine of a migration destination.

Advantageous Effects of Invention

According to the present invention, a virtual machine can be seamlessly migrated with less influence on services in the NFV environment.

BRIEF DESCRIPTION OF DRAWINGS

FIG. 4 is a diagram illustrating a table example of a virtual machine migratable/nonmigratable state management table.

FIG. 5 is a table diagram illustrating an example of determination conditions.

FIG. 6 is a sequence diagram illustrating processing performed in migratability determination in an NFV environment of the present embodiment (virtual machine migration request common sequence).

DESCRIPTION OF EMBODIMENTS

Figure 1:
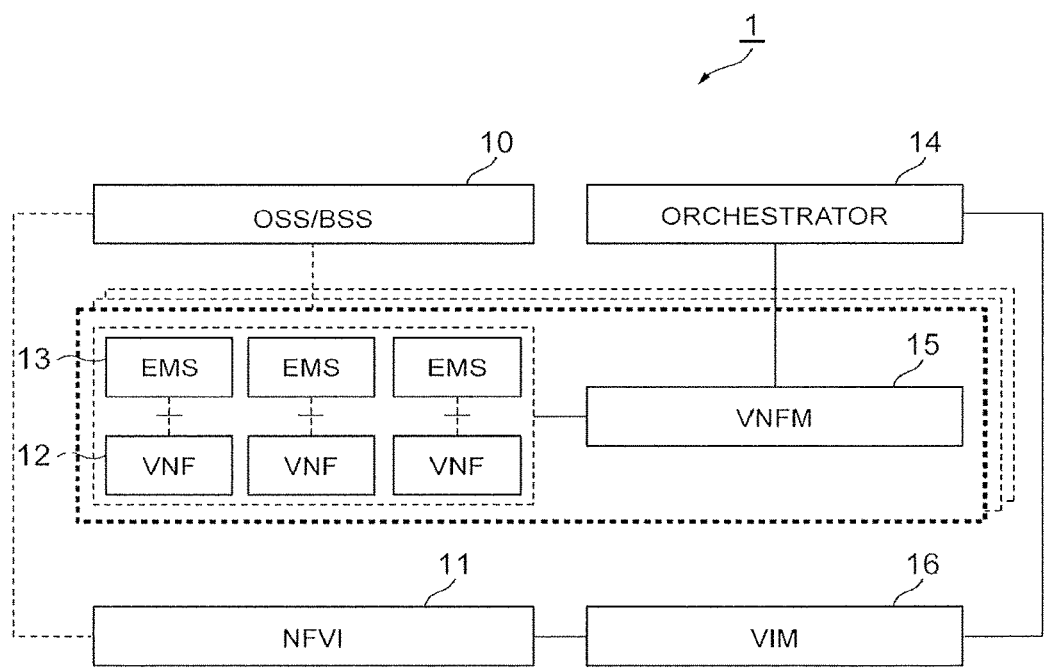
FIG. 1 is a system schematic diagram of a mobile communication system according to an embodiment of the present invention.

Embodiments of an apparatus, a method, and a program will be described in detail below with reference to the drawings. In addition, in the description of the drawings, the same components are assigned the same reference numerals, and the redundant description will be omitted.

FIG. 1 is a system schematic diagram of an NFV environment 1 (a communication system) including a VIM 16 according to an embodiment of the present invention. The NFV environment 1 is an environment (architecture) compliant with network functions virtualization (NFV) disclosed in Non Patent Literature 1 described above, and forms a core network of a mobile communication network. In addition, the NFV environment 1 includes virtualized resources including a physical machine on which virtual machine(s) having a below-described VNF 12 being a virtualized communication function is implemented. As illustrated in FIG. 1, the NFV environment 1 includes an OSS/BSS 10, a network functions virtualization infrastructure (NFVI) 11, the VNF 12 (virtual communication function), an EMS 13, an orchestrator 14 (overall management node), a VNFM 15, and the VIM 16 (virtualized resource management node). In addition, constituent elements required to transmit and receive information to and from one another are connected in a wired manner or the like, so that information can be transmitted and received therebetween.

The NFV environment 1 is a system for providing a mobile communication terminal (mobile machine) (not illustrated) with a mobile communication function. The mobile communication terminal is an apparatus used by a user and connected to a mobile communication system (mobile communication network) through radio communication to perform mobile communication. Specifically, the mobile communication terminal corresponds to a mobile phone or the like. For example, the mobile communication terminal establishes call connection with a facing node via the NFV environment 1 to perform communication. For example, the mobile communication terminal becomes capable of performing mobile communication, by the user of the mobile communication terminal making a contract with a communication service provider of the NFV environment 1. In addition, the mobile communication terminal may be the one similar to a conventional mobile communication terminal.

The NFVI 11 corresponds to a physical resource, a virtualization layer, and a virtualized resource that form a virtualized environment. The physical resource includes a computational resource, a storage resource, and a transmission resource. The virtualization layer virtualizes the physical resource, and provides the virtualized physical resource to the VNF 12 (APL) (e.g., hypervisor). The virtualized resource is a virtualized infrastructure resource provided to the VNF 12. In other words, the NFVI 11 corresponds to virtualized resources including a physical server, which is a physical server apparatus for performing communication processing in the NFV environment 1. The physical server includes a CPU (core, processor), a memory, and a storage means such as a hard disc. Normally, a plurality of physical servers constituting the NFVI 11 is collectively placed at a point such as a data center (DC). At the data center, the placed physical servers are connected to one another via a network within the data center, so that information can be transmitted and received therebetween. In addition, the NFV environment 1 is provided with a plurality of data centers. The data centers are connected to one another via a network, and physical servers provided in different data centers can transmit and receive information to and from each other via the network.

The VNF 12 is a virtual server, which is a virtual communication processing node for executing communication processing (function of executing communication processing that is included in the virtual server). The VNF 12 is implemented in the NFVI 11. For example, the VNF 12 is implemented by using virtual machine(s) (VM) technology in the following manner. First, a CPU included in the NEVI 11 is allocated for the VNF 12. On the allocated CPU, virtual machine(s) is implemented. Executing a program on the virtual machine(s) implements the VNF 12. Normally, the VNF 12 is generated (implemented) according to communication processing to be executed. In addition, the VNF 12 may include a plurality of virtual network function components (VNFCs) being constituent elements thereof.

The NFV environment 1 includes 1 or more (or a plurality of) VNFs 12. In an IMS, the VNF 12 corresponds to a node such as a call session control function (CSCF) and an application server (AS). Alternatively, in a General Packet Radio Service (GPRS) system, which is one of mobile communication systems, for example, the VNF 12 corresponds to a node such as a Serving GPRS Support Node (SGSN). In a Long Term Evolution/Evolved Packet Core (LTE/EPC) system, the VNF 12 corresponds to a node such as a Mobility Management Entity (MME) and a Serving Gateway (S-GW).

The EMS 13 is a node for monitoring and controlling the VNF 12. Similarly to the VNF 12, the EMS 13 is virtually implemented in the NFVI 11 as well. The EMS 13 is generated in association with the VNF 12 (for example, in a one-on-one relationship with the VNF 12 as illustrated in FIG. 1). The EMS 13 monitors and controls the VNF 12 associated therewith. The EMS 13 manages the fault, configuration, accounting, performance, and security (FCAPS) of the VNF 12. The EMS 13 may be virtually implemented as described above, or may be physically implemented for avoiding management complexity in the FCAPS management.

The OSS/BSS 10 is a node for managing services in the NFV environment 1, and issuing an instruction relating to a communication function in the NFV environment 1, to the orchestrator 14 and the like. For example, the OSS/BSS 10 instructs the orchestrator 14 and the like to start a new communication function (communication service). In addition, the OSS/BSS 10 receives information from the EMS 13, and based on the information, issues an instruction to the orchestrator 14 and the like, or the EMS 13. In addition, the OSS/BSS 10 is operated by a communication service provider relating to the NFV environment 1.

The orchestrator 14 is an overall management node (functional entity) for managing the entire NFVI 11 corresponding to virtualized resources. The orchestrator 14 receives an instruction from the OSS/BSS 10 (OSS of the OSS/BSS 10), and performs processing according to the instruction. The orchestrator 14 performs management over all the virtualized resources of the mobile communication network of an infrastructure and a communication service. The orchestrator 14 implements the communication service constituted by the plurality of VNFs 12, at an appropriate location through the VNFM 15 and the VIM 16. For example, life cycle management (specifically, for example, generation, update, scale control, event collection) of services, resource dispersion/reservation/allocation management over the entire mobile communication network, service/instance management, and policy management (specifically, for example, resource reservation/allocation, optimum placement based on geography/laws and the like) are performed.

The VNFM 15 is a virtual communication function management node (functional entity) for managing the VNF 12. A plurality of VNFMs 15 may be provided in the NFV environment 1. In this case, the VNFM 15 managed for each VNF 12 may be predefined. The VNFM 15 performs life cycle management of the VNF 12 (APL). The VNFM 15 performs overall control relating to the virtualization of the VNF 12. For example, the VNFM 15 performs the generation, update, scaling control, termination, and automatic healing of a VNF 12 instance.

The VIM 16 is a virtualized resource management node (functional entity) for managing each virtualized resource (infrastructure resource) in the implementation unit of the VNF 12 in the NFVI 11. Specifically, the VIM 16 manages resource allocation/update/collection, associates virtual resources with physical resources, and manages a list of hardware resources and SW resources (hypervisor). Normally, the VIM 16 performs management for each data center (station). The management of virtualized resources can be performed by a method suitable for a data center. The management method of data centers (implementation method of management resources) includes types such as OPENSTACK and vCenter. Normally, the VIM 16 is provided for each data center management method. In other words, the NFV environment 1 includes a plurality of VIMs 16 for managing each virtualized resource in the implementation unit of the VNF 12 in the NFVI 11, using methods different from one another. In addition, the unit of virtualized resources managed using different management methods does not have to be necessarily a data center unit.

In addition, the orchestrator 14, the VNFM 15, and the VIM 16 are implemented by programs being executed on a physical server apparatus (this, however, is not to be construed as restricting virtual implementation, and they may be virtually implemented after separating a management system). The orchestrator 14, the VNFM 15, and the VIM 16 may be respectively implemented in different physical server apparatuses, or may be implemented in the same server apparatus. The orchestrator 14, the VNFM 15, and the VIM 16 (programs for implementing the orchestrator 14, the VNFM 15, and the VIM 16) may be provided from different vendors.

In addition, the above-described architecture is compliant with that described in Non Patent Literature 1 described above. In addition, for implementing a mobile communication function, the NFV environment 1 may include constituent elements other than those described above. For example, the NFV environment 1 may include an apparatus of a base station and an open flow network (including virtualized ones as described above), and the like.

Figure 2:
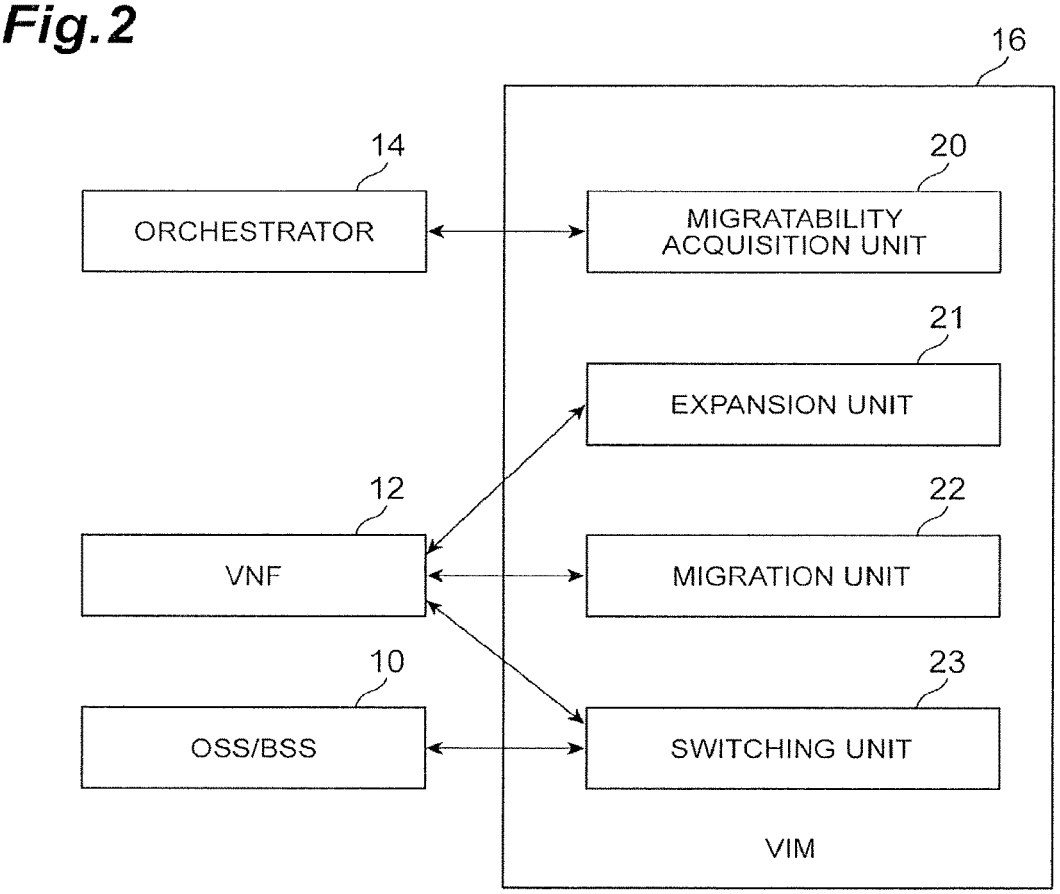
FIG. 2 is a functional block diagram of a virtualized resource management node according to the embodiment of the present invention.

FIG. 2 is a functional block diagram of the VIM 16. As illustrated in FIG. 2, the VIM 16 includes a migratability acquisition unit 20 (migratability acquisition means), an expansion unit 21 (expansion means), a migration unit 22 (migration means), and the switching unit 23 (switching means).

Figure 3:
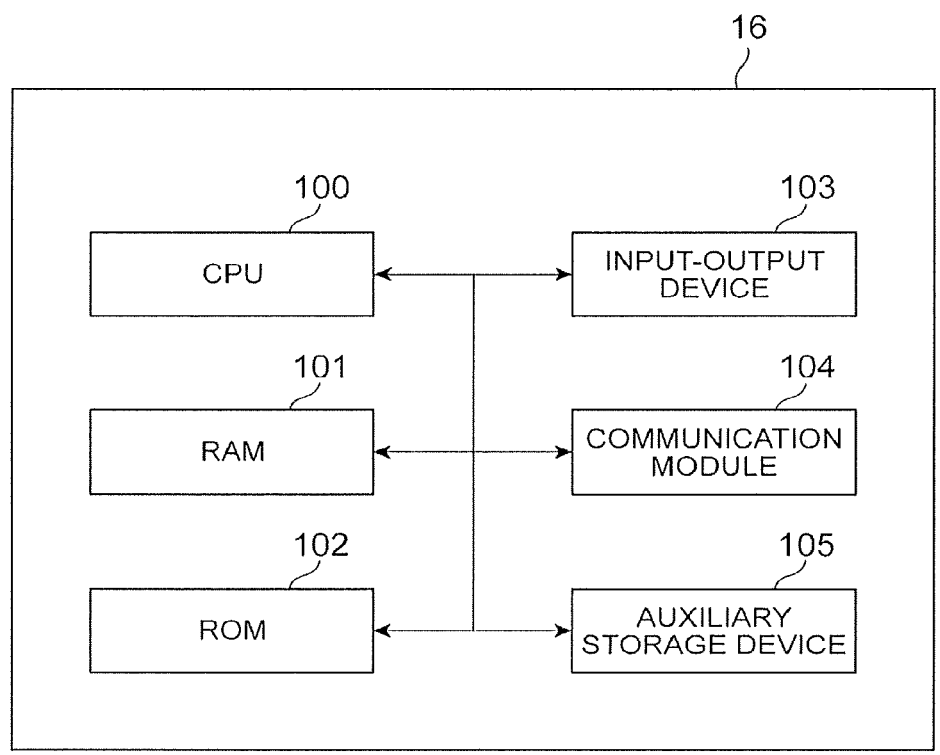
FIG. 3 is a diagram illustrating a hardware configuration of the virtualized resource management node according to the embodiment of the present invention.

The VIM 16 is constituted by hardware components such as a CPU. FIG. 3 is a diagram illustrating an example of a hardware configuration of the VIM 16. The VIM 16 illustrated in FIG. 2 is physically formed as a computer system including a CPU 100, a RAM 101 and a ROM 102 that serve as main storage devices, an input-output device 103 such as a display, a communication module 104, an auxiliary storage device 105, and the like, as illustrated in FIG. 3.

The function of each functional block of the VIM 16 illustrated in FIG. 2 is implemented in the following manner. More specifically, by loading predetermined computer software on hardware such as the CPU 100, the RAM 101, and the like that are illustrated in FIG. 3, the input-output device 103, the communication module 104, and the auxiliary storage device 105 are operated under the control of the CPU 100. In addition, by reading and writing data on the RAM 101, the function is implemented.

Each functional block of the VIM 16 illustrated in FIG. 2 will be described below.

The expansion unit 21 adds on a virtual machine of a migration source and a virtual machine of a migration destination. More specifically, the expansion unit 21 adds on a SBY system virtual machine of the migration source, an ACT system virtual machine of the migration source, a SBY system virtual machine of the migration destination, and an ACT system virtual machine of the migration destination.

Here, the ACT system and the SBY system are terms representing service states of an application operating within a virtual machine. The ACT system represents that the application is providing a service. On the other hand, the SBY system represents that the application operates as a secondary system of the ACT system. Triggered by an operation of a maintenance personnel or failure, the SBY system itself can transition to the ACT system by taking over a service state from the ACT system.

The migration unit 22 migrates the SBY system virtual machine of the migration source to the SBY system virtual machine of the migration destination through live migration. In addition, the migration unit 22 may migrate the ACT system virtual machine of the migration source to the ACT system virtual machine of the migration destination through live migration.

The migratability acquisition unit 20 transmits, to the orchestrator 14, a migration request for requesting the migration of a virtual machine, and receives, as a response thereto, migratability indicating the availability/unavailability of the migration of the virtual machine that has been determined in the orchestrator 14 based on a predetermined determination criterion, from the orchestrator 14. FIG. 4 is a diagram illustrating a table example of a virtual machine migratable/nonmigratable state management table stored in the orchestrator 14. As illustrated in FIG. 4, in the virtual machine migratable/nonmigratable state management table, a migratable/nonmigratable state ("migratable" indicates that migration is available, and "nonmigratable" indicates that migration is unavailable) is associated with each virtual machine ID, which is identification information of a virtual machine. Based on the virtual machine migratable/nonmigratable state management table stored in the orchestrator 14, the orchestrator 14 may determine the migratability of a virtual machine.

Migratable/nonmigratable states in the virtual machine migratable/nonmigratable state management table are set based on a determination condition determined by the OSS/BSS 10 and the orchestrator 14. FIG. 5 is a table diagram illustrating an example of determination conditions. The orchestrator 14 may determine the migratability of a virtual machine using the determination conditions illustrated in FIG. 5, as "AND conditions" or "OR conditions".

The switching unit 23 switches a network flow from a virtual machine of a migration source to a virtual machine of a migration destination, or switches a system between an ACT system virtual machine of a migration source and a SBY system virtual machine of a migration destination. More specifically, the switching unit 23 switches a network flow from a virtual machine of a migration source to a virtual machine of a migration destination that has been added on by the expansion unit 21. In addition, the switching unit 23 may switch a system between the ACT system virtual machine of the migration source and the SBY system virtual machine of the migration destination that has been added on by the expansion unit 21. In addition, the switching unit 23 may switch a system between the ACT system virtual machine of the migration source and the SBY system virtual machine of the migration destination that has been migrated by the migration unit 22. In addition, the switching unit 23 may perform the switching in a case in which the migratability received by the migratability acquisition unit 20 indicates that migration is available.

[Migration Method 1: Scaling Out/In +Network Switching]

A migration method obtained by combining scaling in/out performed using a virtualization function and OpenFlow (registered trademark) or network route switching performed using an application will be described below using sequence diagrams in FIGS. 6 to 9 and system state diagrams in FIGS. 10 to 13.

FIG. 6 is a sequence diagram illustrating processing performed in migratability determination in the NFV environment 1 of the present embodiment (virtual machine migration request common sequence). First, in S1, a virtual machine migration request is transmitted from the VIM 16 to the orchestrator 14. Next, in S2, a service state request for inquiring about a service state is transmitted from the orchestrator 14 to the OSS/BSS 10. Next, in S3, the service state request is transmitted from the OSS/BSS 10 to the EMS 13. Next, in S4, a service state response including a service state of a targeted VNF 12 is transmitted from the EMS 13 to the OSS/BSS 10. Next, in S5, the service state response is transmitted from the OSS/BSS 10 to the orchestrator 14 as a response to the request. In addition, the processing in S2 to S5 may be periodically performed (collected).

Next, in S6, the orchestrator 14 determines migratability based on the service state response received in S5. Next, in S7, a migratability determination result is transmitted from the orchestrator 14 to the VIM 16.

Figure 7:
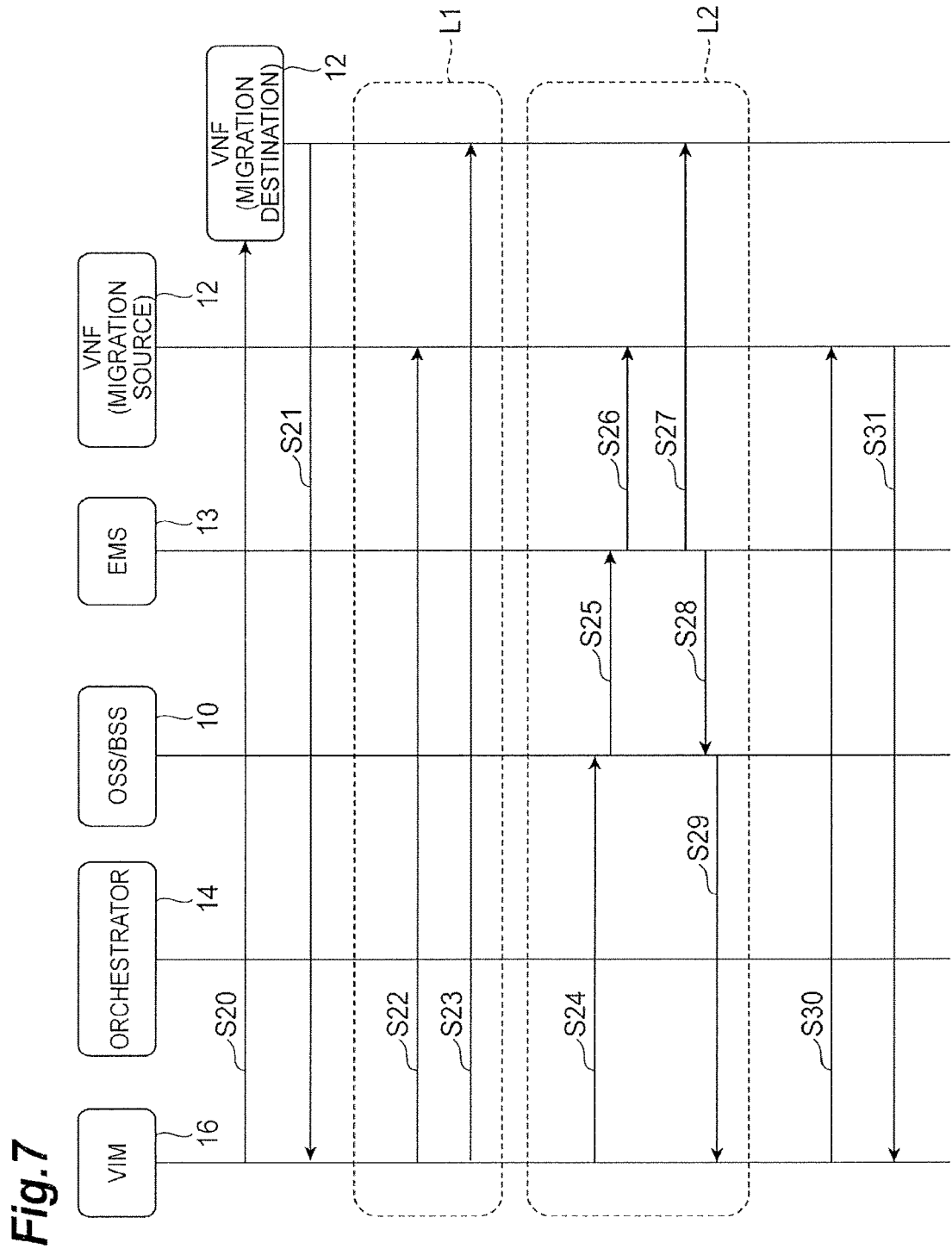
FIG. 7 is a sequence diagram illustrating virtual machine migration processing in the NFV environment of the present embodiment (sequence 1).

FIG. 7 is a sequence diagram illustrating virtual machine migration processing in the NFV environment 1 of the present embodiment (sequence 1, virtual machine migration method). The processing is subsequent processing performed when determination indicating that migration is available is obtained in the VIM 16. For example, the processing is performed immediately after S7 in FIG. 6. First, in S20, the VIM 16 adds on a virtual machine VNF 12 serving as a migration destination. Next, upon expansion completion of the VNF 12, in S21, a virtual machine expansion completion notification is transmitted from the migration destination VNF 12 to the VIM 16.

Subsequently to S21, in S22 and S23, the VIM 16 executes network switching on a migration source VNF 12 and the migration destination VNF 12 (switching step). In addition, a processing group L1 including the processing in S22 and S23 is processing performed in a case in which network switching is performed in the VIM 16 (virtualization base level).

In addition, subsequently to S21, in S24, a network switching request is transmitted from the VIM 16 to the OSS/BSS 10. Next, in S25, the network switching request is transmitted from the OSS/BSS 10 to the EMS 13 managing the targeted VNF 12. Next, in S26 and S27, the network switching request is transmitted from the EMS 13 to the targeted migration source VNF 12 and the migration destination VNF 12 (switching step). Upon network switching completion, in S28, a network switching completion notification is transmitted from the EMS 13 to the OSS/BSS 10. Next, in S29, the network switching completion notification is transmitted from the OSS/BSS 10 to the VIM 16. In addition, a processing group L2 including the processing in S24 to S29 is processing performed in a case in which network switching is performed in the EMS 13 (application level). Either one of the processing groups L1 and L2 is alternatively executed.

Upon completion of the processing of the processing group L1 or L2, in S30, the VIM 16 executes virtual machine removal processing on the migration source VNF 12. Upon completion of the removal processing, a virtual machine removal completion notification is transmitted from the migration source VNF 12 to the VIM 16.

Figure 8:
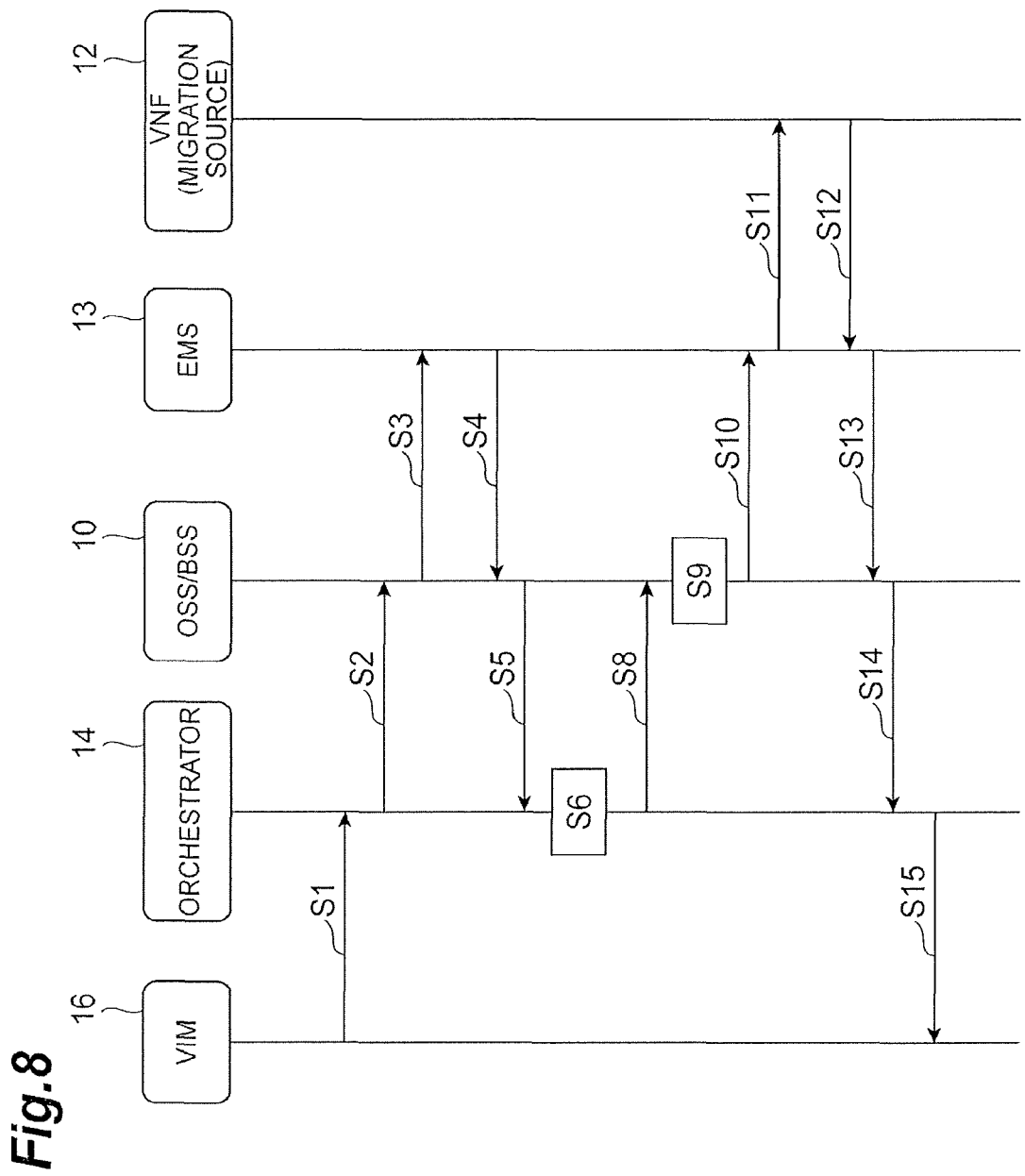
FIG. 8 is a sequence diagram illustrating another processing performed in migratability determination in the NFV environment of the present embodiment (state changeable common sequence).

FIG. 8 is a sequence diagram illustrating another processing performed in migratability determination in the NFV environment 1 of the present embodiment (state changeable common sequence). The processing in S1 to S6 in FIG. 8 is similar to that in FIG. 6. Thus, the description will be omitted. Subsequently to S6, in S8, a service state change request is transmitted from the orchestrator 14 to the OSS/BSS 10. Next, in S9, the OSS/BSS 10 determines service state changeability. If the service state is determined in S9 to be changeable, in S10, a service state change instruction is transmitted from the OSS/BSS 10 to the EMS 13 managing the targeted VNF 12. Next, in S11, the service state change instruction is transmitted from the EMS 13 to the targeted migration source VNF 12.

Next, in S12, a service state change notification is transmitted from the migration source VNF 12 to the EMS 13. Next, in S13, the service state change notification is transmitted from the EMS 13 to the OSS/BSS 10. Next, in S14, the service state change notification is transmitted from the OSS/BSS 10 to the orchestrator 14. Next, in S15, a virtual machine migration response indicating that migration is available is transmitted from the orchestrator 14 to the VIM 16. Similarly to the virtual machine migration request common sequence illustrated in FIG. 6, the sequence 1 illustrated in FIG. 7 is executed subsequent to the state changeable common sequence illustrated in FIG. 8.

Figure 9:
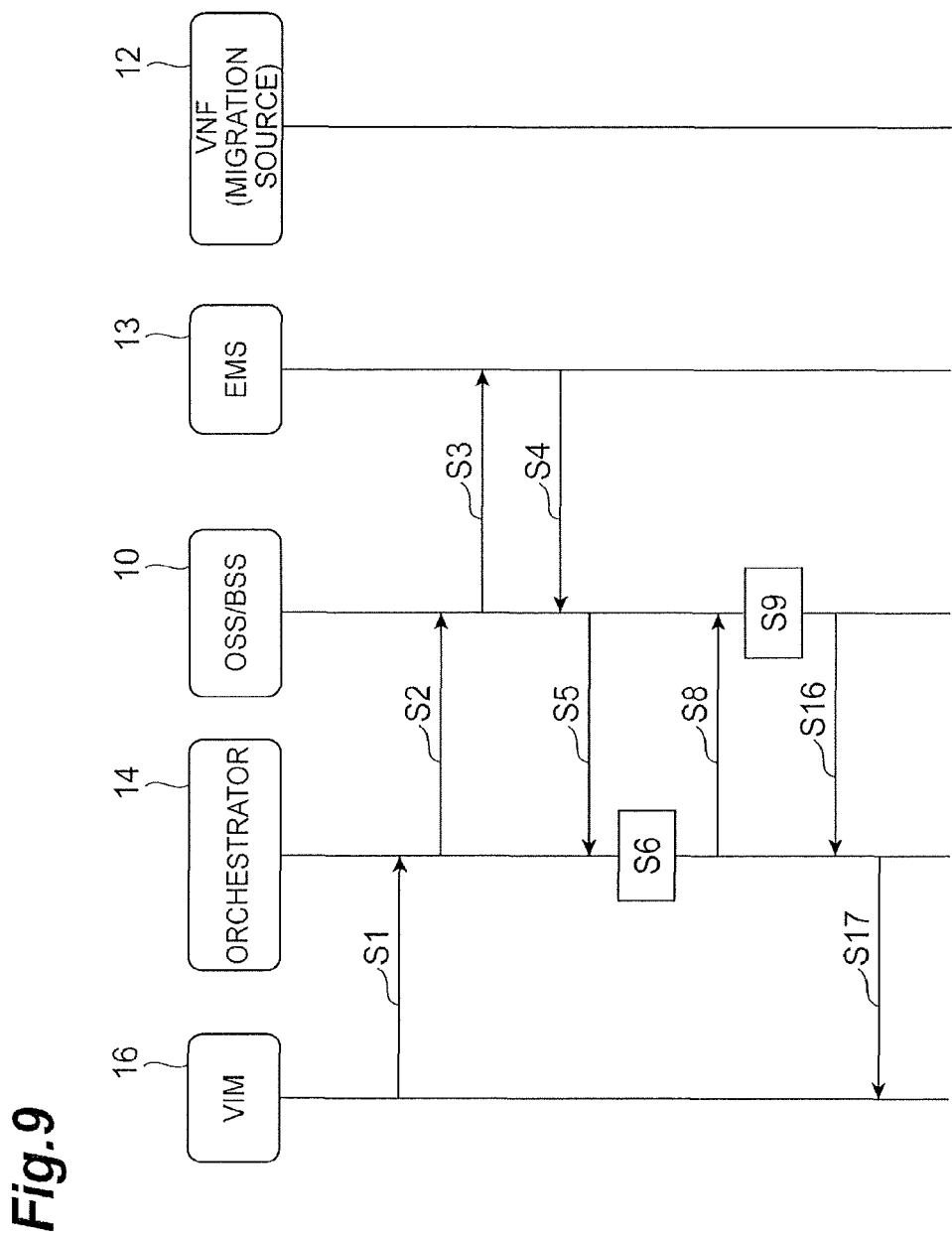
FIG. 9 is a sequence diagram illustrating processing performed in a non-migratable case in the NFV environment of the present embodiment (non-migratable common sequence).

FIG. 9 is a sequence diagram illustrating processing performed in a non-migratable case in the NFV environment 1 of the present embodiment (non-migratable common sequence). The processing in S1 to S6, and S8 and S9 in FIG. 9 is similar to that in FIGS. 6 and 8. Thus, the description will be omitted. If the service state is determined in S9 to be unchangeable, in S16, a service state unchangeable response is transmitted from the OSS/BSS 10 to the orchestrator 14. Next, in S17, the service state unchangeable response is transmitted from the orchestrator 14 to the VIM 16. In addition, the non-migratable common sequence is similarly executed in below-described migration methods 2 and 3. In addition, the non-migratable common sequence is executable also in the case of an N+M ACT configuration.

Figure 10:
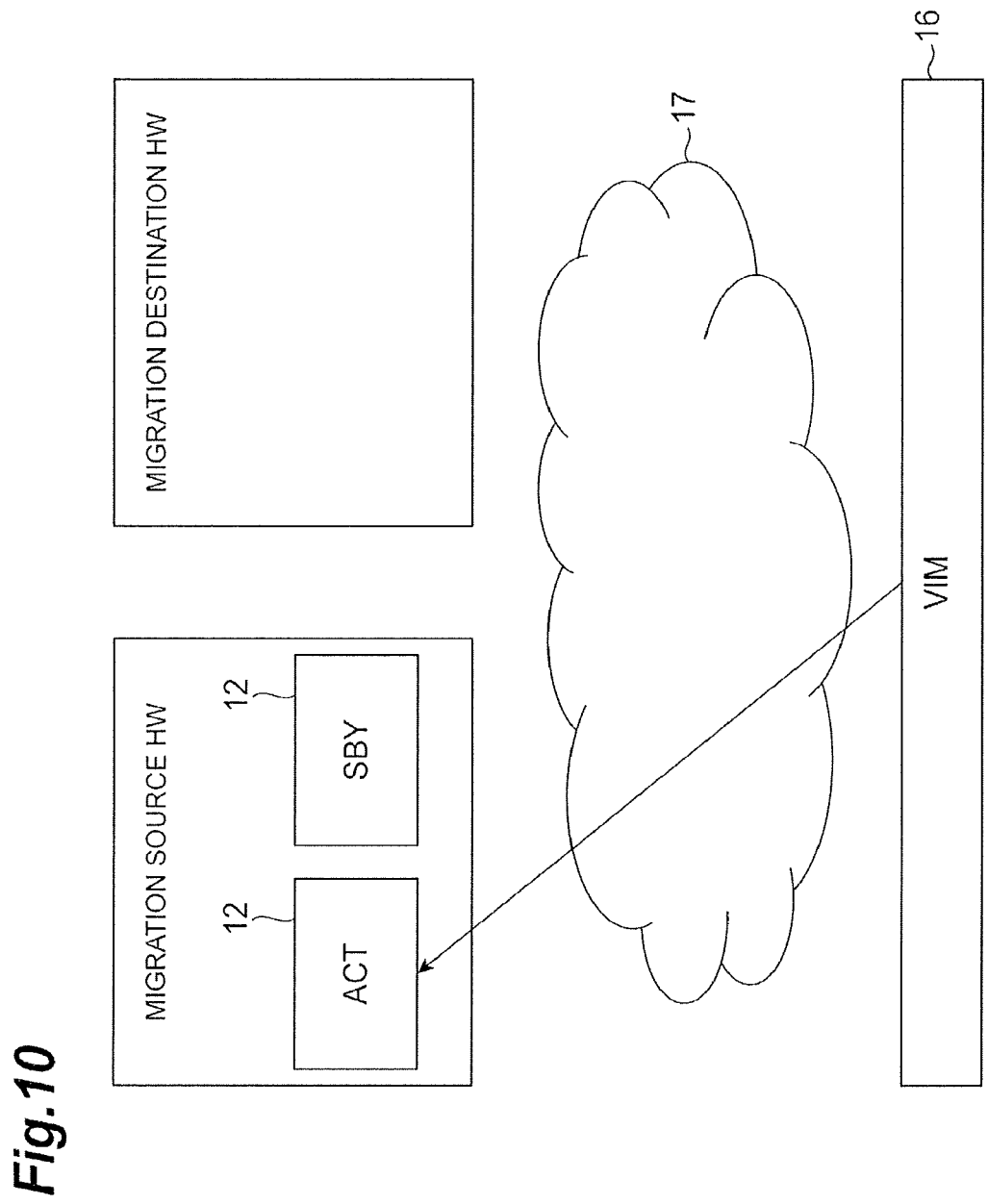
FIG. 10 is a diagram illustrating a first state (an initial state) of the NFV environment in processing performed by a migration method 1.

FIG. 10 is a state diagram illustrating an initial state of the NFV environment 1 in processing performed by the migration method 1. As illustrated in FIG. 10, in the initial state, an ACT system VNF 12 and a SBY system VNF 12 are operating on migration source hardware (HW). In addition, in the migration method 1 and the below-described migration methods 2 and 3, before processing is started, migration destination HW is installed (including a network wiring and the like), and processing of installing an operating system (OS), middleware, and applications onto the migration destination HW is performed. In addition, after the processing is started, the migration source HW is removed. In addition, FIGS. 10 to 13, 15 to 20, and 22 to 25, which are state diagrams for illustrating the migration method 1 and the below-described migration methods 2 and 3, illustrate the ACT system VNF 12 and the SBY system VNF 12 with being included in the same migration source HW or the same migration destination HW. This, however, is not a limiting case. For example, from the aspect of availability, the ACT system VNF 12 and the SBY system VNF 12 may be separately included in different 2 pieces of migration source HW, or the ACT system VNF 12 and the SBY system VNF 12 may be separately included in different 2 pieces of migration destination HW.

Figure 11:
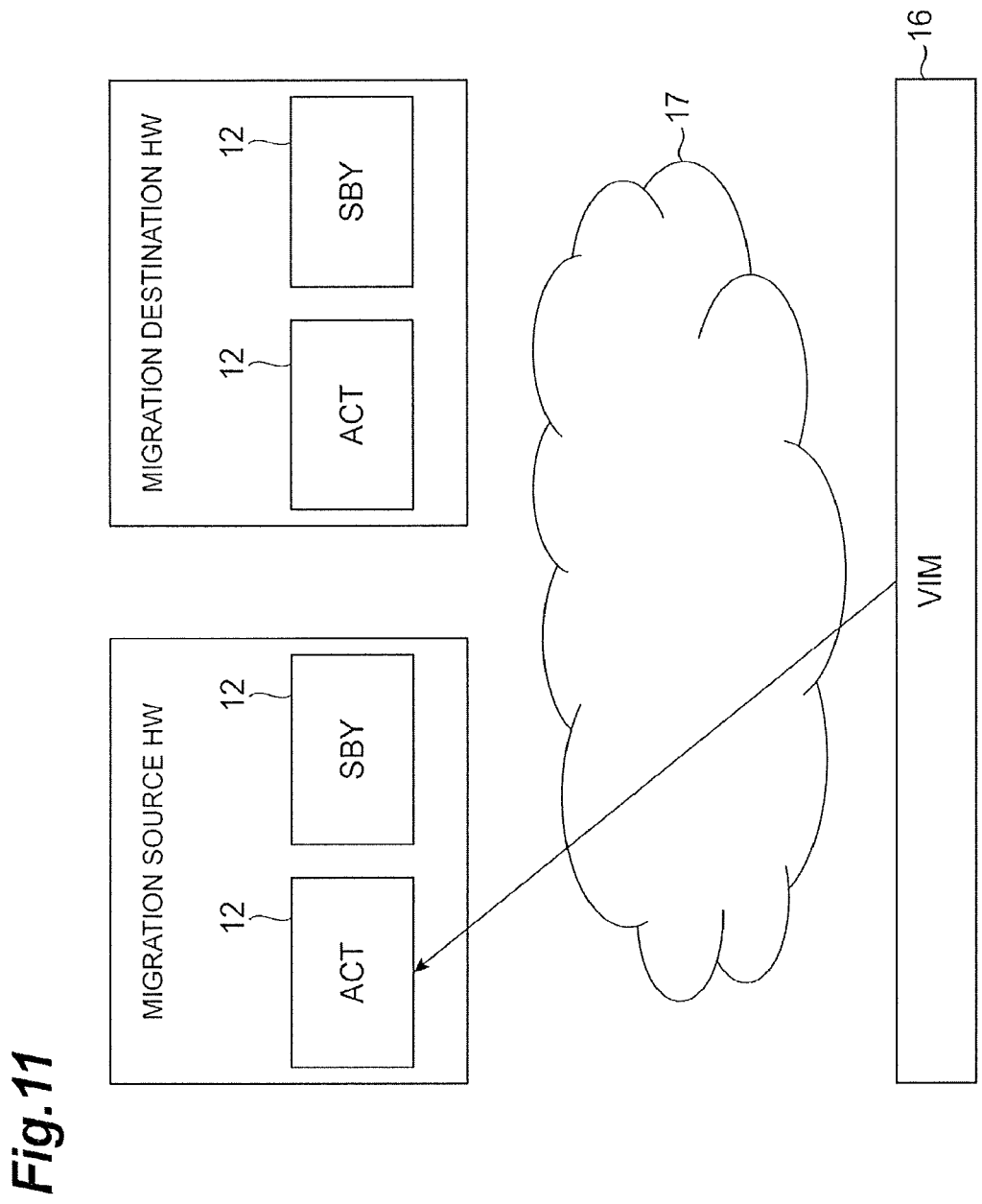
FIG. 11 is a diagram illustrating a second state of the NFV environment in the processing performed by the migration method 1.
Figure 12:
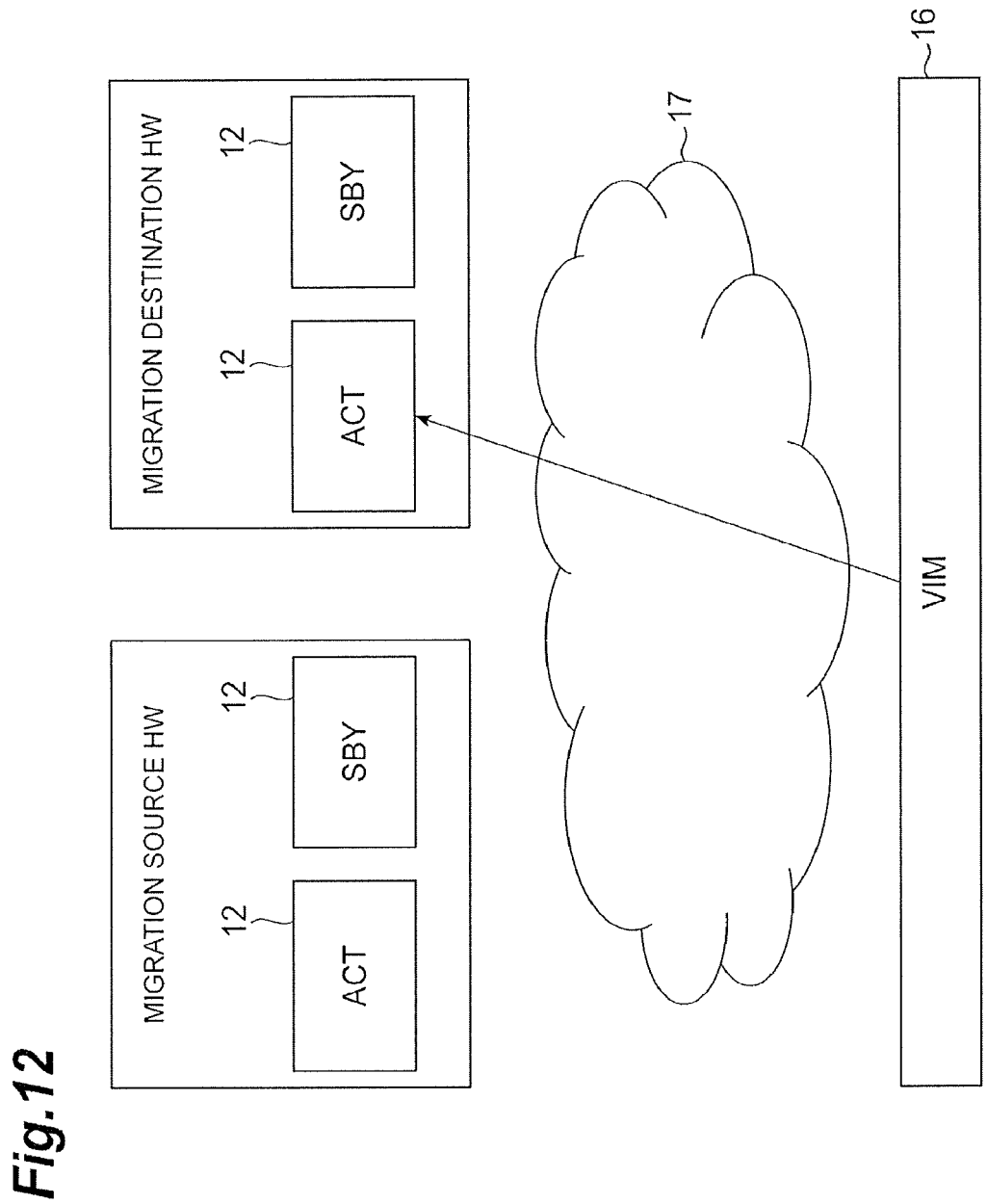
FIG. 12 is a diagram illustrating a third state of the NFV environment in the processing performed by the migration method 1.
Figure 13:
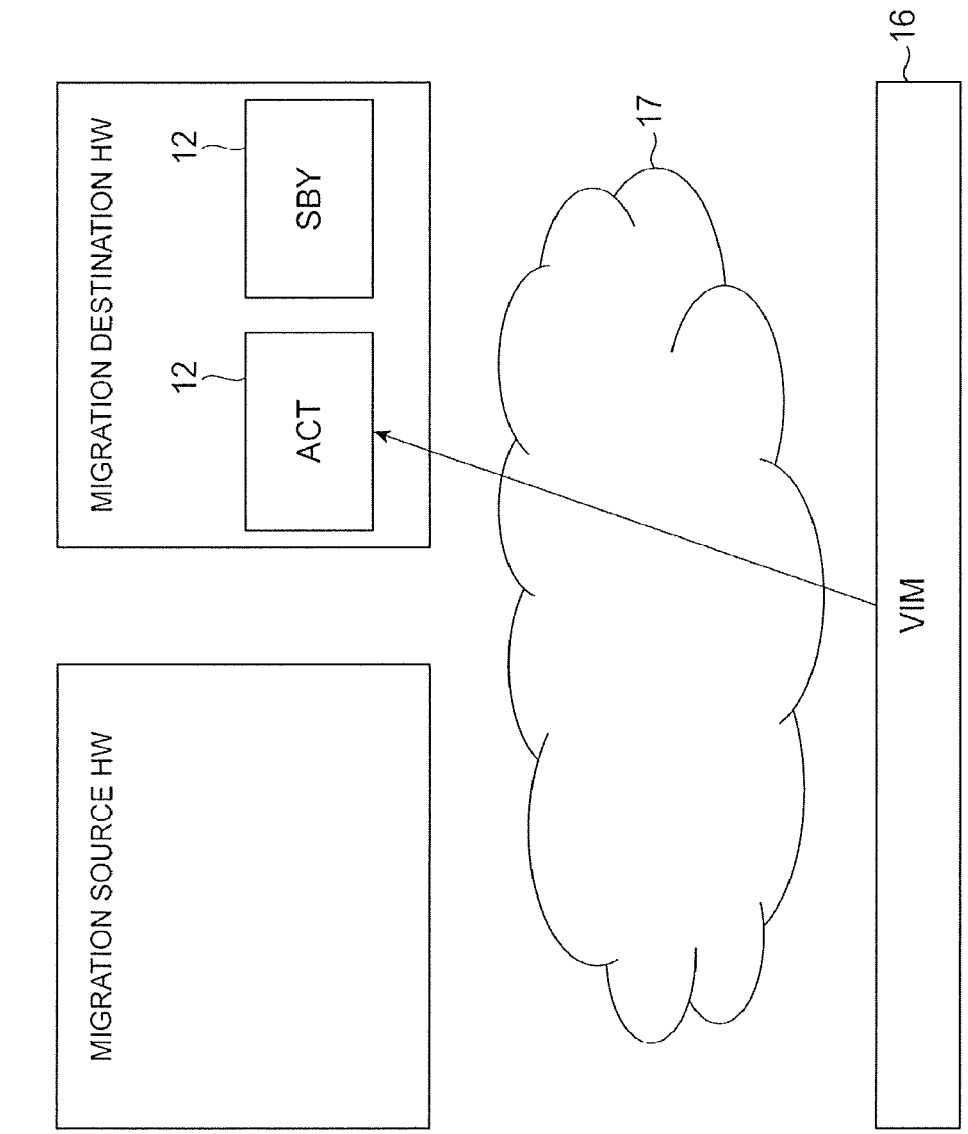
FIG. 13 is a diagram illustrating a fourth state of the NFV environment in the processing performed by the migration method 1.

Next, FIG. 11 illustrates a state in which, in the state illustrated in FIG. 10, the expansion unit 21 of the VIM 16 has added on an ACT system VNF 12 and a SBY system VNF 12 (having configurations equivalent to those of the ACT system VNF 12 and the SBY system VNF 12 on the migration source HW) to the migration destination HW. Next, FIG. 12 illustrates a state in which, in the state illustrated in FIG. 11, the switching unit 23 of the VIM 16 has performed network switching from the VNF 12 on the migration source HW to the VNF 12 on the migration destination HW (using the function of OpenFlow or a function of an application). Next, FIG. 13 illustrates a state in which, in the state illustrated in FIG. 12, a removing unit (not illustrated) of the VIM 16 has removed the VNF 12 on the migration source HW (graceful shutdown).

In addition, in the case of the N+M ACT configuration, in the state diagrams in FIGS. 10 to 13, the SBY system VNFs 12 do not have to be provided on the migration source HW and the migration destination. HW (or an idling secondary system). In addition, as described above using the processing group L1 or L2 in FIG. 7, network switching has 2 methods (base level or application level), and a control sequence varies according to the methods.

[Migration Method 2: Scaling Out/In +System Switching]

A migration method obtained by combining scaling in/out performed using the virtualization function and system switching performed using an application (middleware) will be described below using a sequence diagram in FIG. 14 and system state diagrams in FIGS. 15 to 20.

Figure 14:
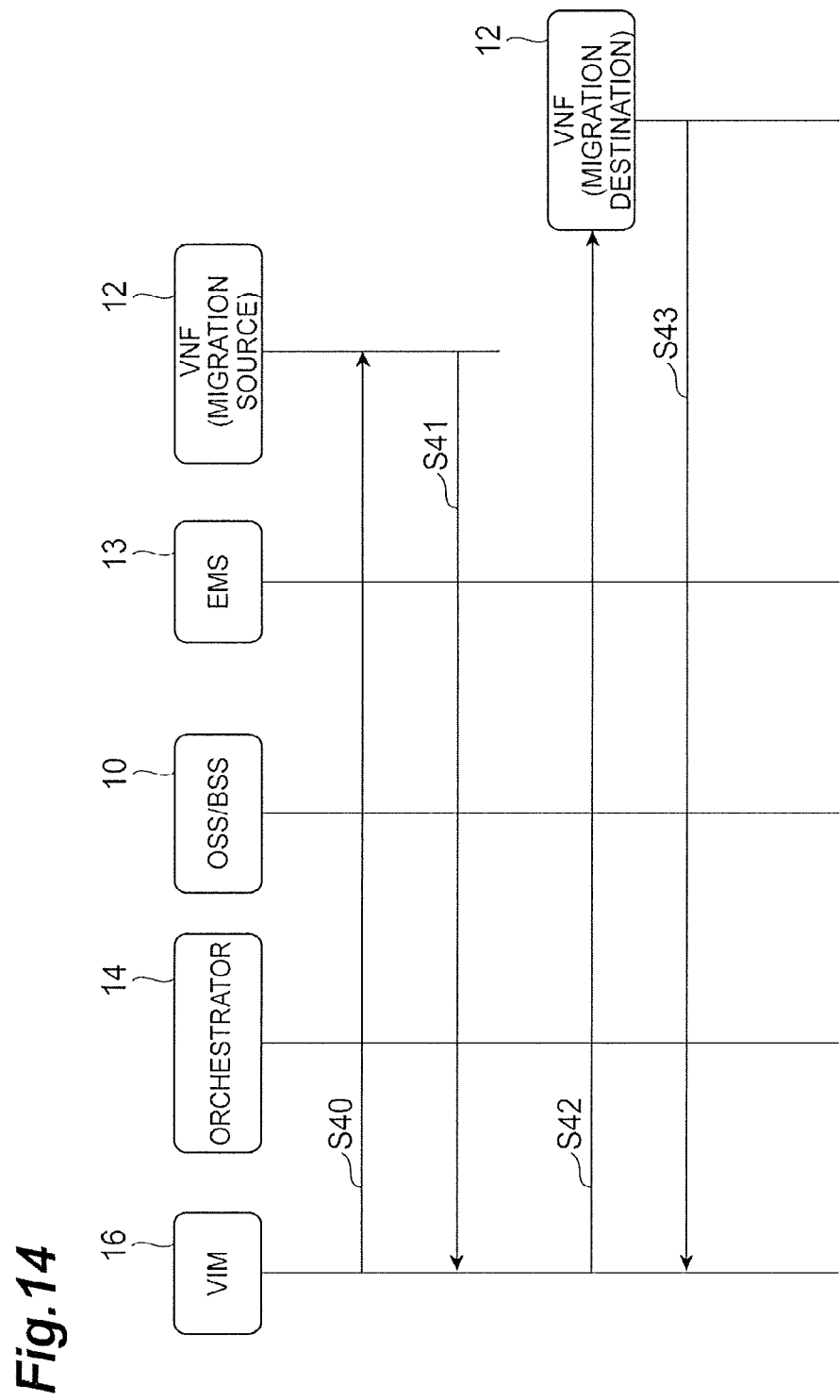
FIG. 14 is a sequence diagram illustrating processing performed in system switching in the NFV environment of the present embodiment (sequence 2).

FIG. 14 is a sequence diagram illustrating system switching processing in the NFV environment 1 of the present embodiment (sequence 2, virtual machine migration method). The processing is performed subsequent to the virtual machine migration request common sequence illustrated in FIG. 6. Subsequently to S6 in FIG. 6, in S40, the VIM 16 performs virtual machine removal of the migration source VNF 12. Upon completion of the removal, in S41, a virtual machine removal completion notification is transmitted from the migration source VNF 12 to the VIM 16. Next, in S42, the VIM 16 performs virtual machine expansion, and the migration destination VNF 12 is added on. Upon completion of the expansion, in S43, a virtual machine expansion completion notification is transmitted from the VNF 12 to the VIM 16.

In addition, the processing order is not limited to the above-described order. In the order of S42, S43, S40, and S41, a SBY system or a secondary server may be added on, and then, a virtual server may be removed. In addition, this sequence 2 may be executed immediately after the state changeable common sequence illustrated in FIG. 8.

Figure 15:
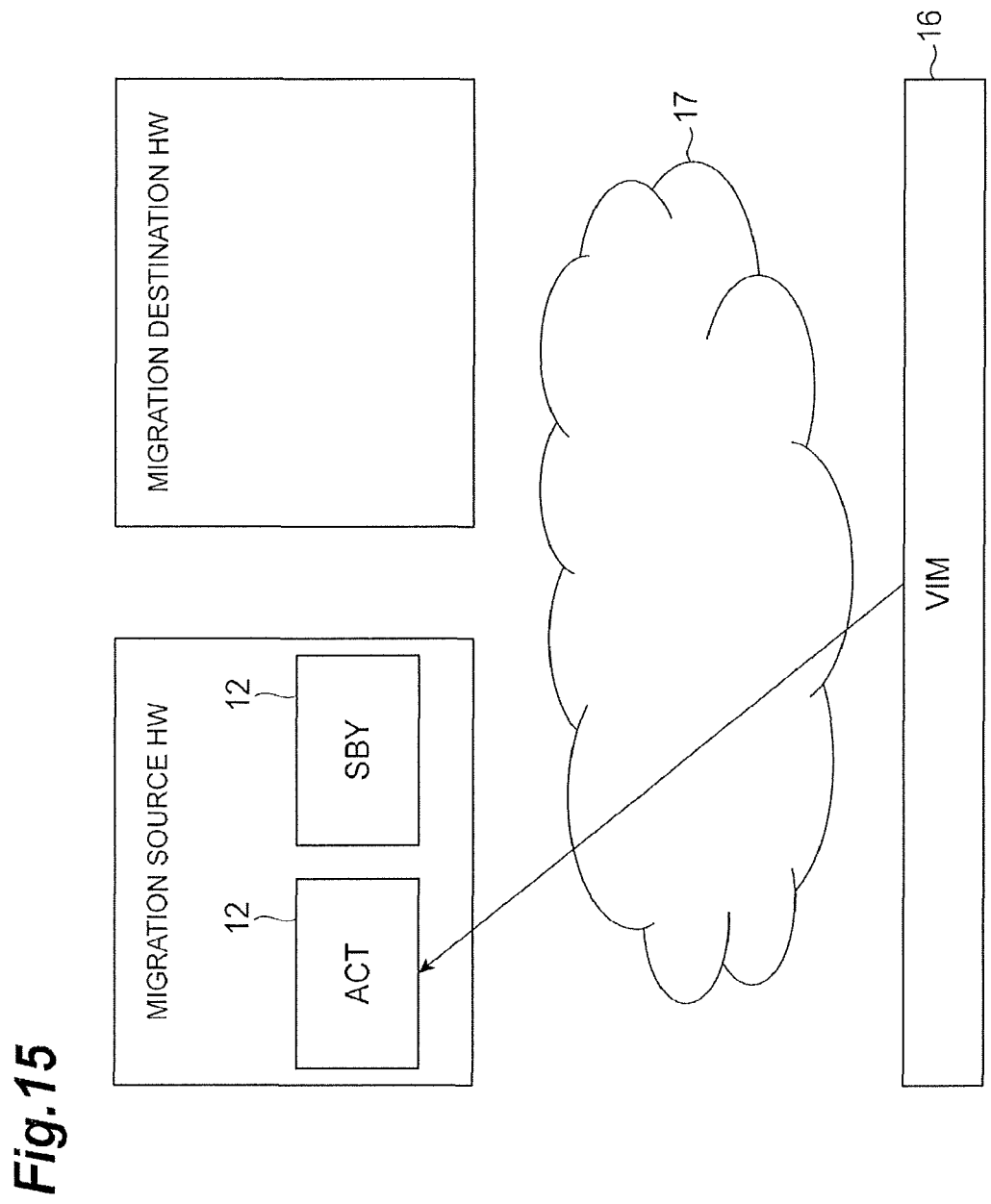
FIG. 15 is a diagram illustrating a first state (an initial state) of the NFV environment in processing performed by a migration method 2.

FIG. 15 is a state diagram illustrating an initial state of the NFV environment 1 in processing performed by the migration method 2. As illustrated in FIG. 15, in the initial state, the ACT system VNF 12 and the SBY system VNF 12 are operating on the migration source HW.

Figure 16:
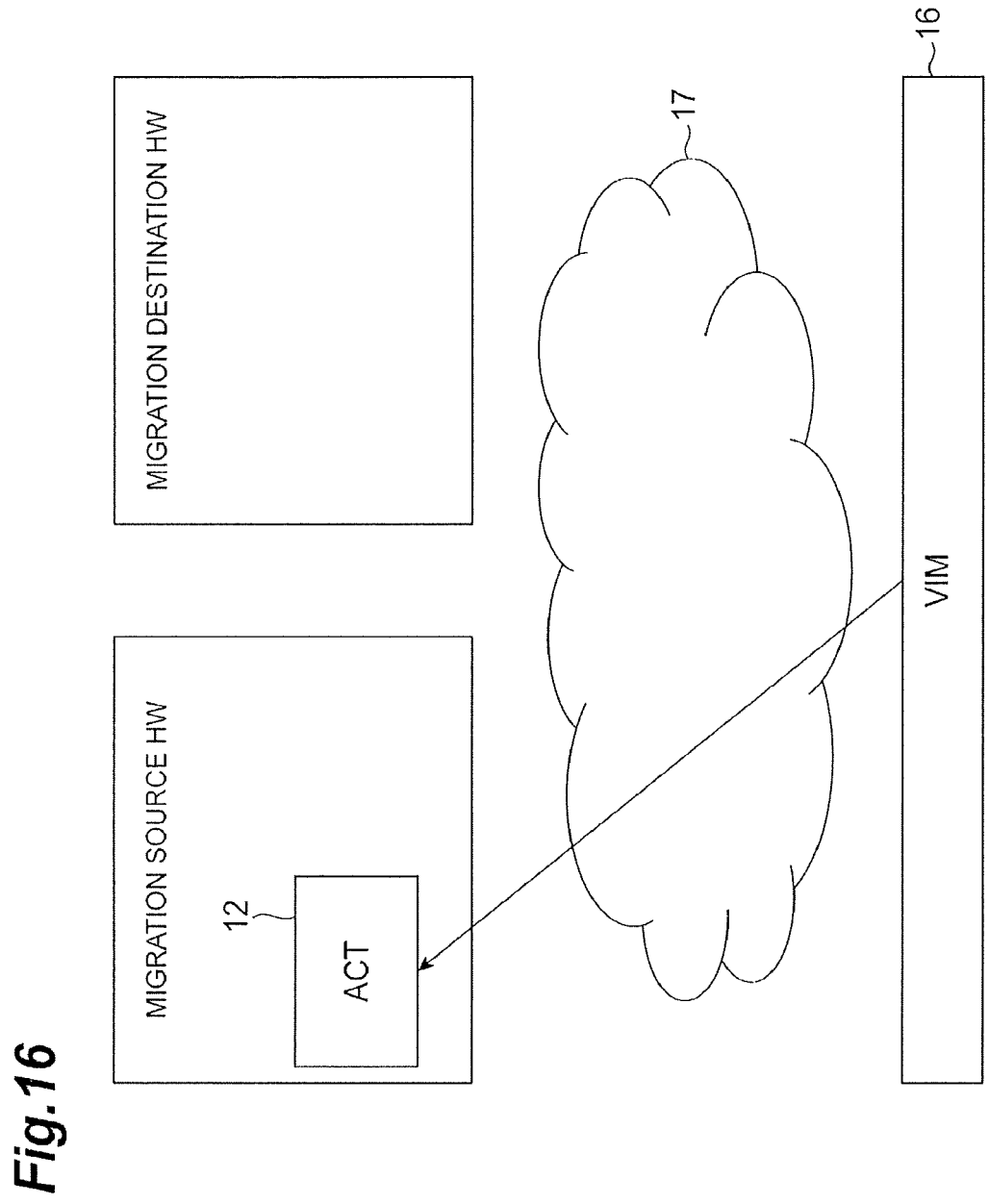
FIG. 16 is a diagram illustrating a second state of the NFV environment in the processing performed by the migration method 2.
Figure 17:
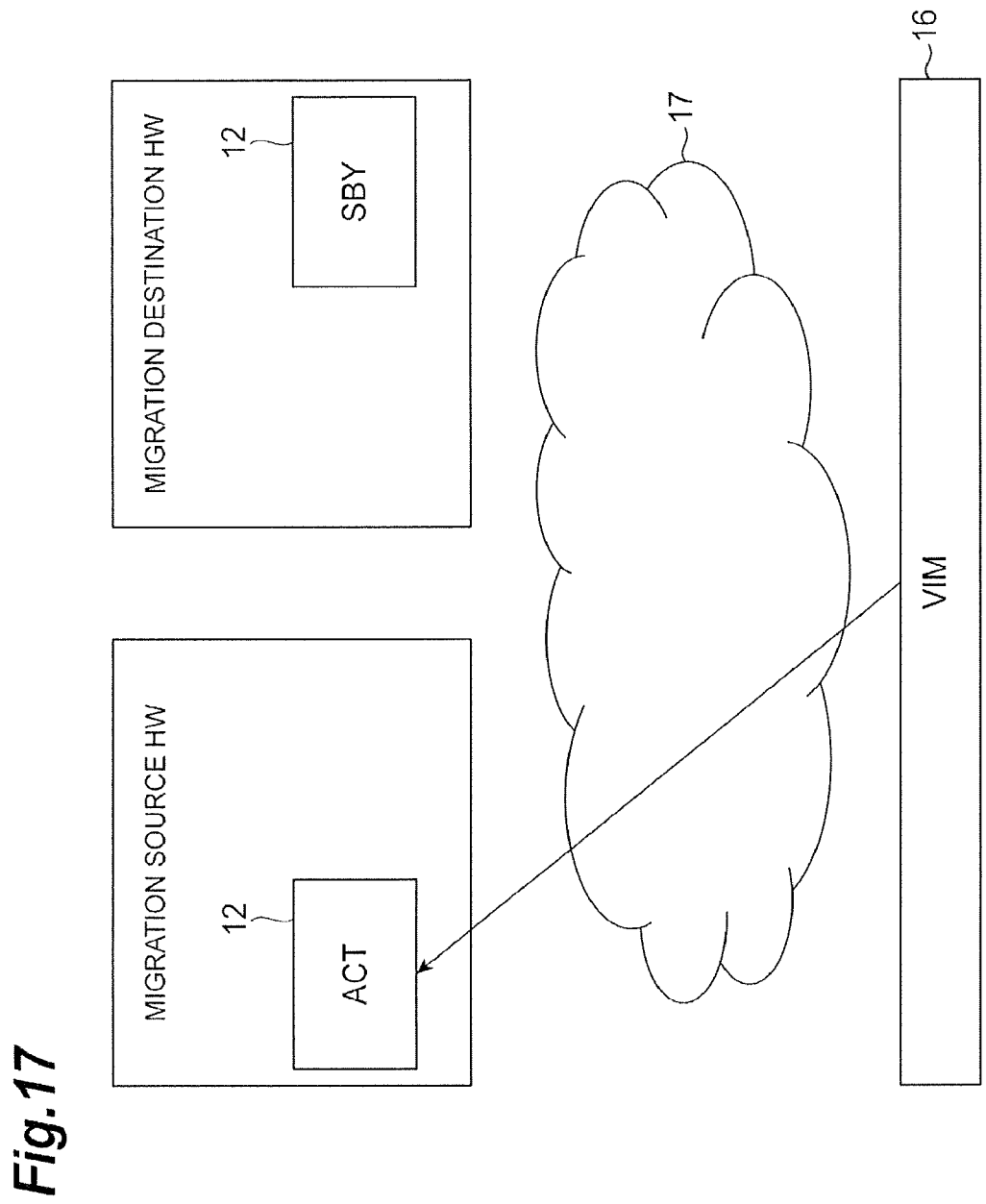
FIG. 17 is a diagram illustrating a third state of the NFV environment in the processing performed by the migration method 2.

Next, FIG. 16 illustrates a state in which, in the state illustrated in FIG. 15, the removing unit of the VIM 16 has removed the SBY system VNF 12 on the migration source HW. Next, FIG. 17 illustrates a state in which, in the state illustrated in FIG. 16, the expansion unit 21 of the VIM 16 has added on the SBY system VNF 12 of the migration destination HW. Next, FIG. 18 illustrates a state in which, in the state illustrated in FIG. 17, the switching unit 23 of the VIM 16 has performed system switching between the ACT system VNF 12 on the migration source HW and the SBY system VNF 12 on the migration destination HW.

Figure 18:
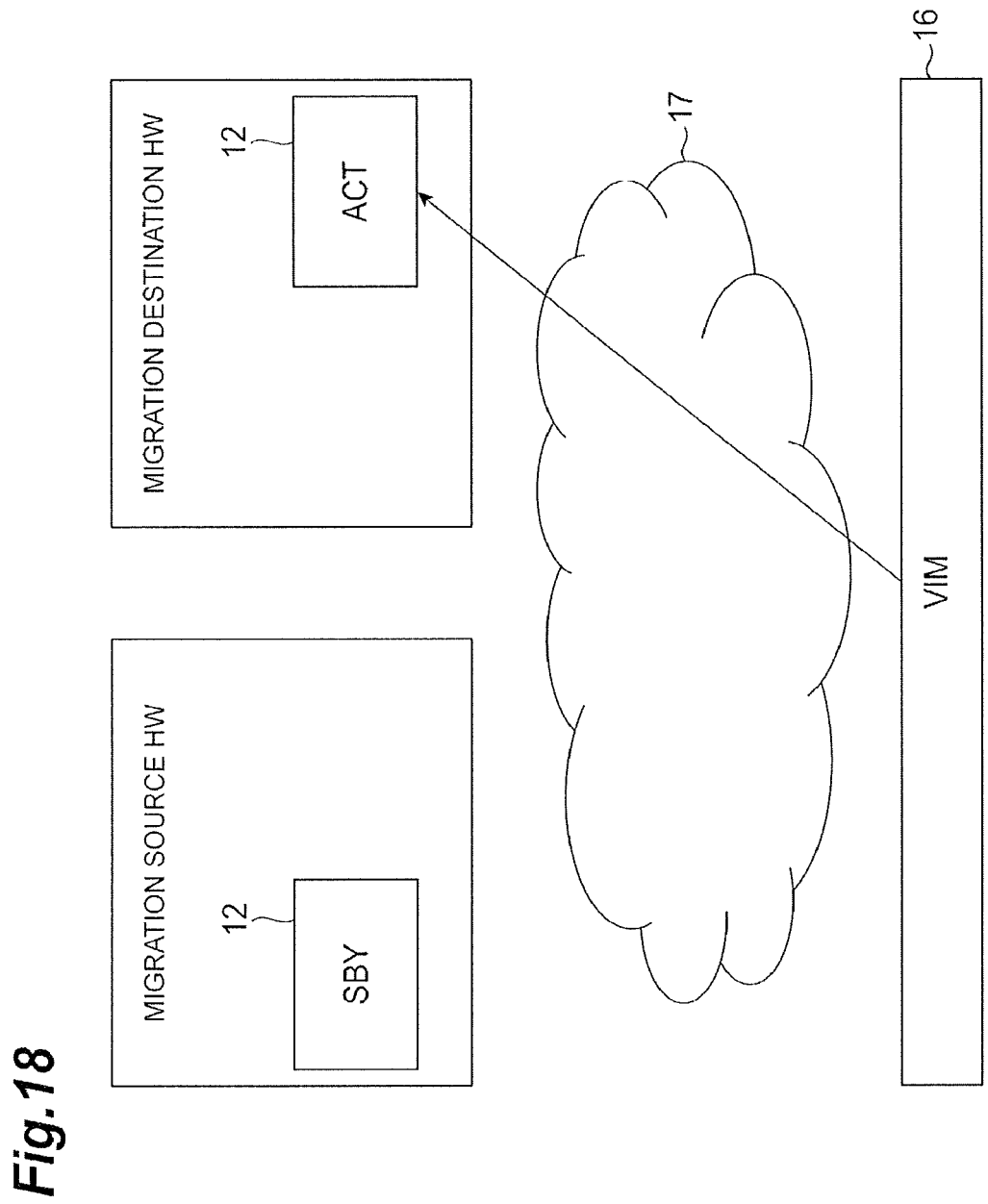
FIG. 18 is a diagram illustrating a fourth state of the NFV environment in the processing performed by the migration method 2.
Figure 19:
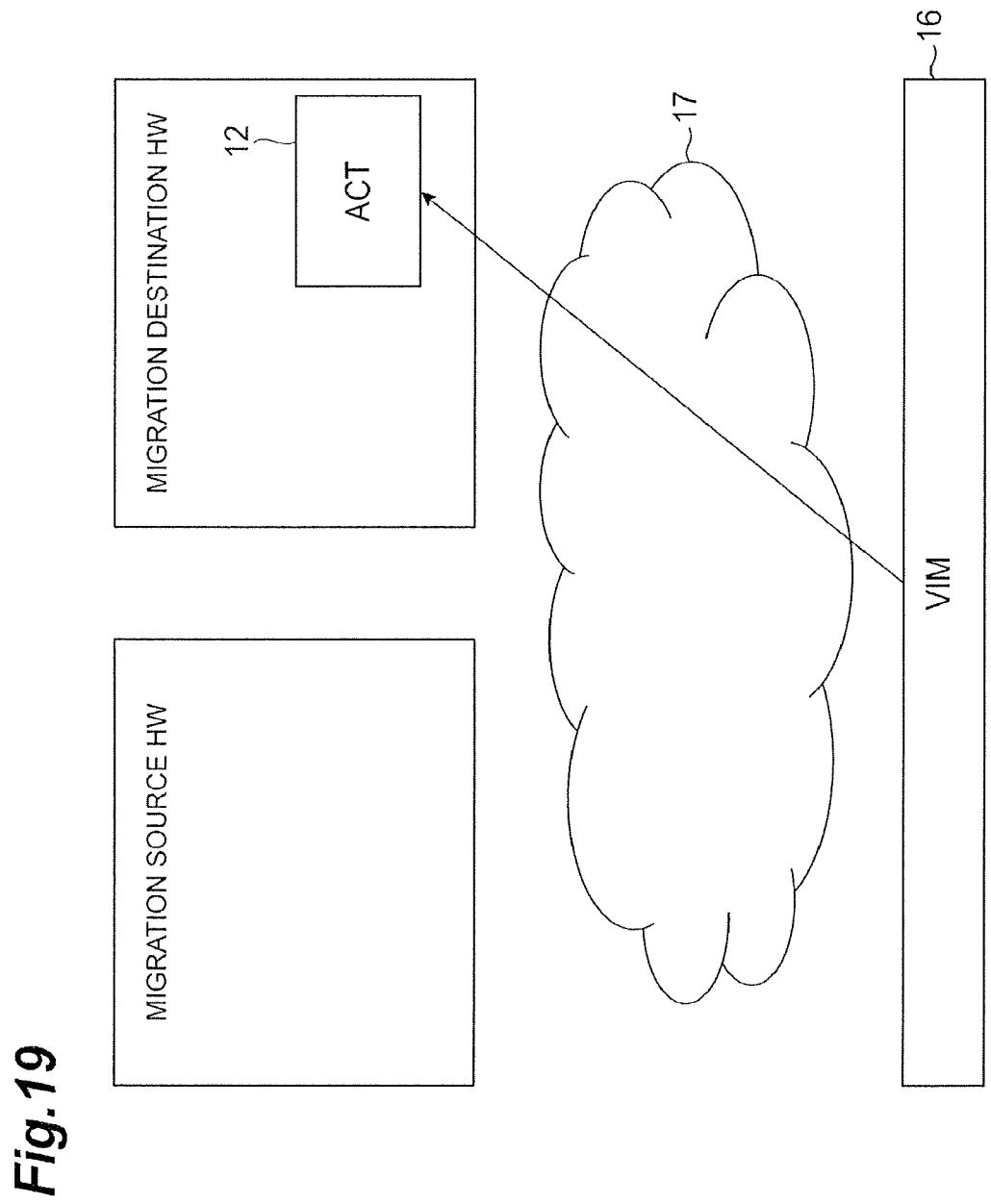
FIG. 19 is a diagram illustrating a fifth state of the NFV environment in the processing performed by the migration method 2.
Figure 20:
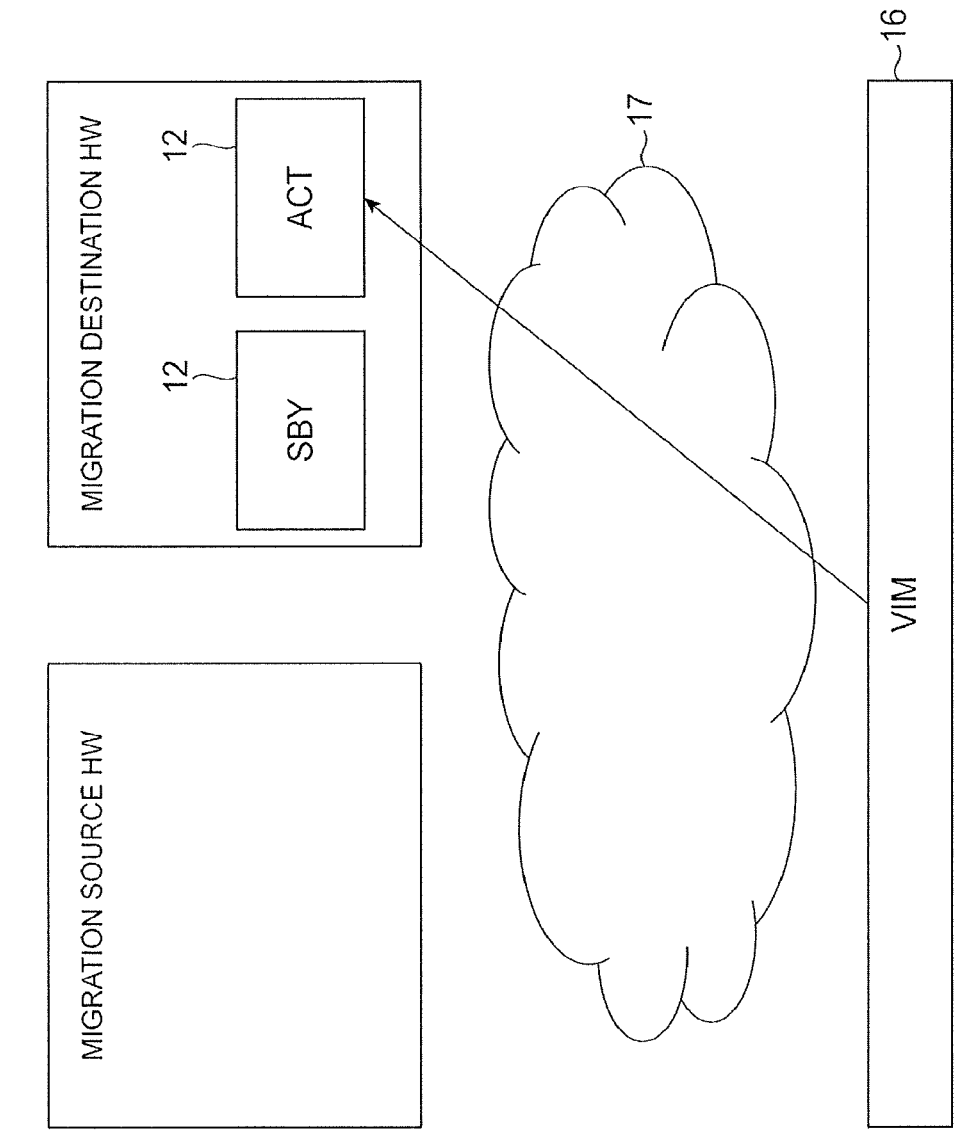
FIG. 20 is a diagram illustrating a sixth state of the NFV environment in the processing performed by the migration method 2.

Next, FIG. 19 illustrates a state in which, in the state illustrated in FIG. 18, the removing unit of the VIM 16 has removed the SBY system VNF 12 on the migration source HW. Next, FIG. 20 illustrates a state in which, in the state illustrated in FIG. 19, the expansion unit 21 of the VIM 16 has added on the SBY system VNF 12 of the migration destination HW.

[Migration Method 3: Live Migration+System Switching]

A migration method obtained by combining live migration performed using the virtualization function and system switching will be described below using a sequence diagram in FIG. 21 and system state diagrams in FIGS. 22 to 25. This migration method can be implemented by a method using Live Block Migration or GlusterFS, even if there is no common storage.

Figure 21:
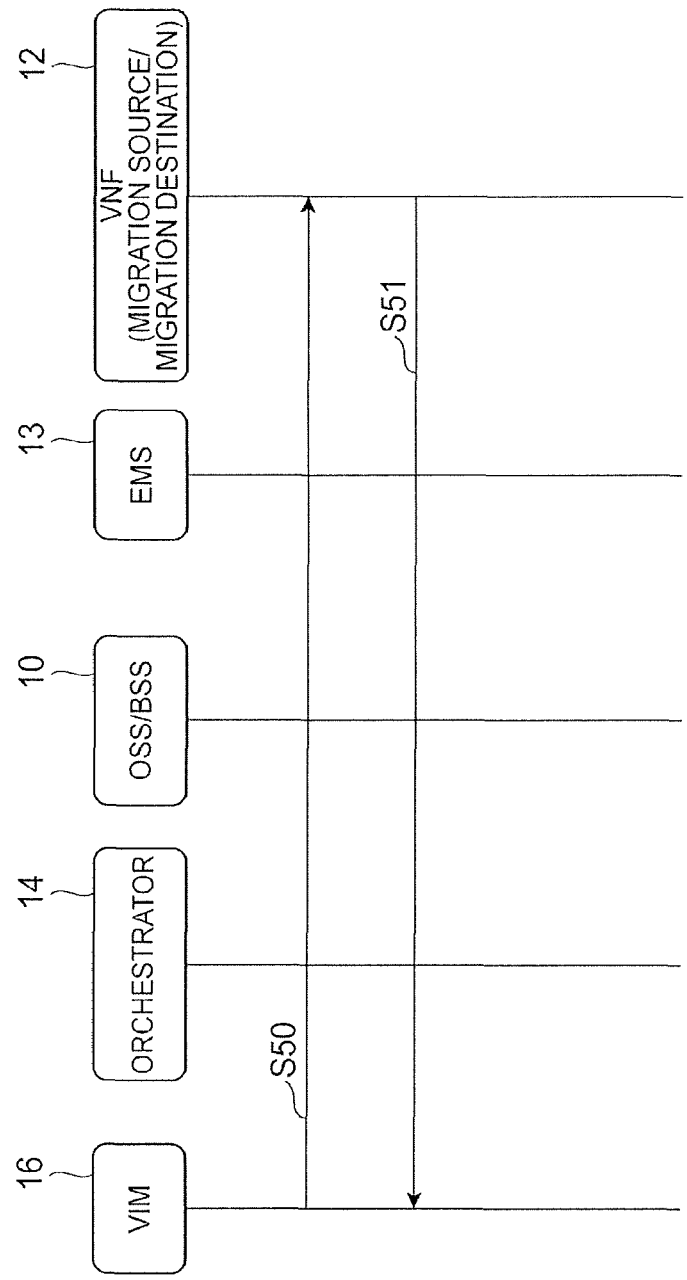
FIG. 21 is a sequence diagram illustrating processing performed in system switching combined with live migration in the NFV environment of the present embodiment (sequence 3).

FIG. 21 is a sequence diagram illustrating processing performed in system switching combined with live migration in the NFV environment 1 of the present embodiment (sequence 3, virtual machine migration method). The processing is performed subsequent to the virtual machine migration request common sequence illustrated in FIG. 6. Subsequently to S6 in FIG. 6, in S50, a live migration instruction is transmitted from the VIM 16 to the migration source VNF 12 and the migration destination VNF 12. Upon completion of the live migration, in S51, a live migration completion notification is transmitted from the migration source VNF 12 and the migration destination VNF 12 to the VIM 16.

Figure 22:
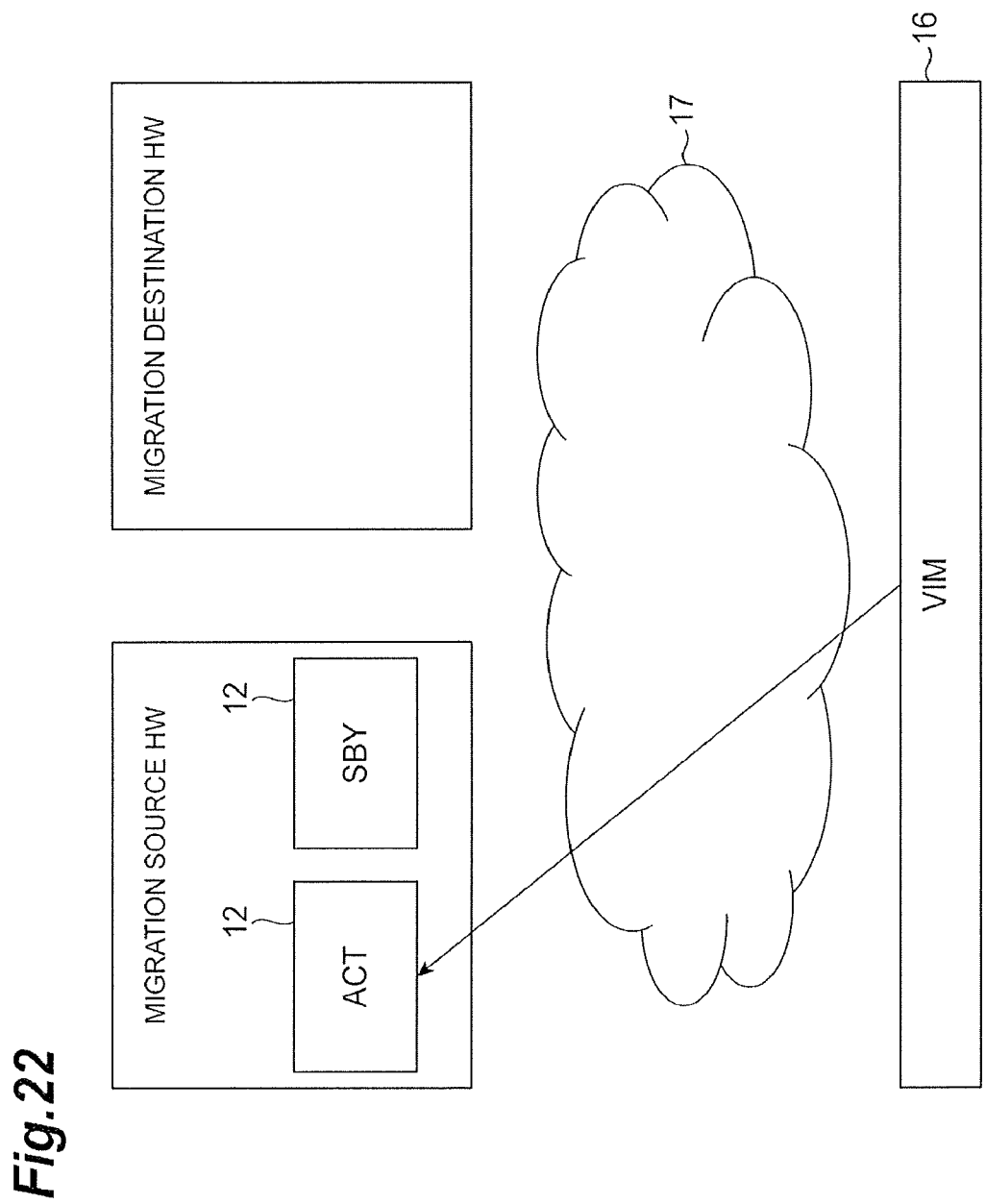
FIG. 22 is a diagram illustrating a first state (an initial state) of the NFV environment in processing performed by a migration method 3.

FIG. 22 is a state diagram illustrating an initial state of the NFV environment 1 in processing performed by the migration method 2. As illustrated in FIG. 22, in the initial state, the ACT system VNF 12 and the SBY system VNF 12 are operating on the migration source HW.

Figure 23:
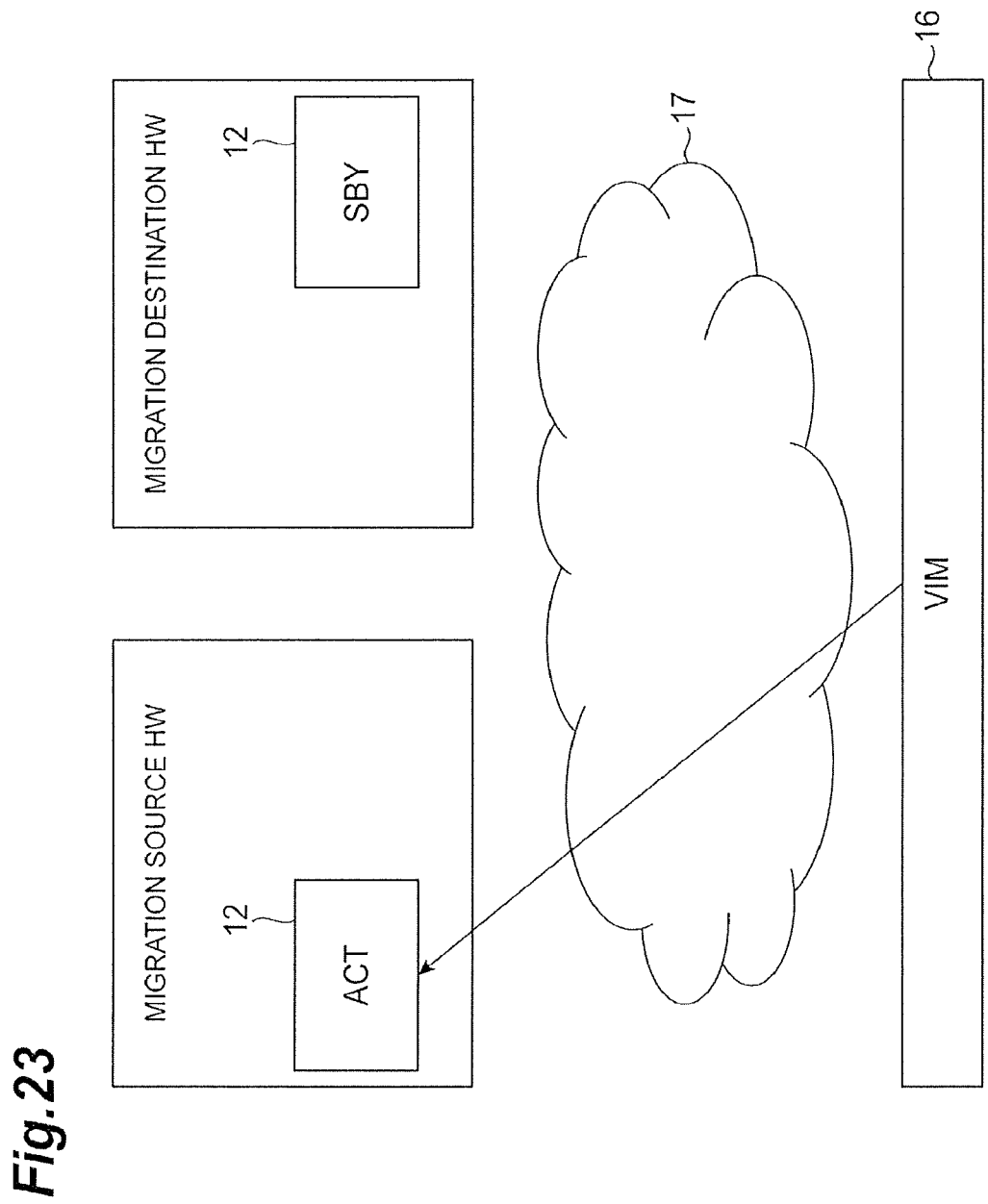
FIG. 23 is a diagram illustrating a second state of the NFV environment in the processing performed by the migration method 3.
Figure 24:
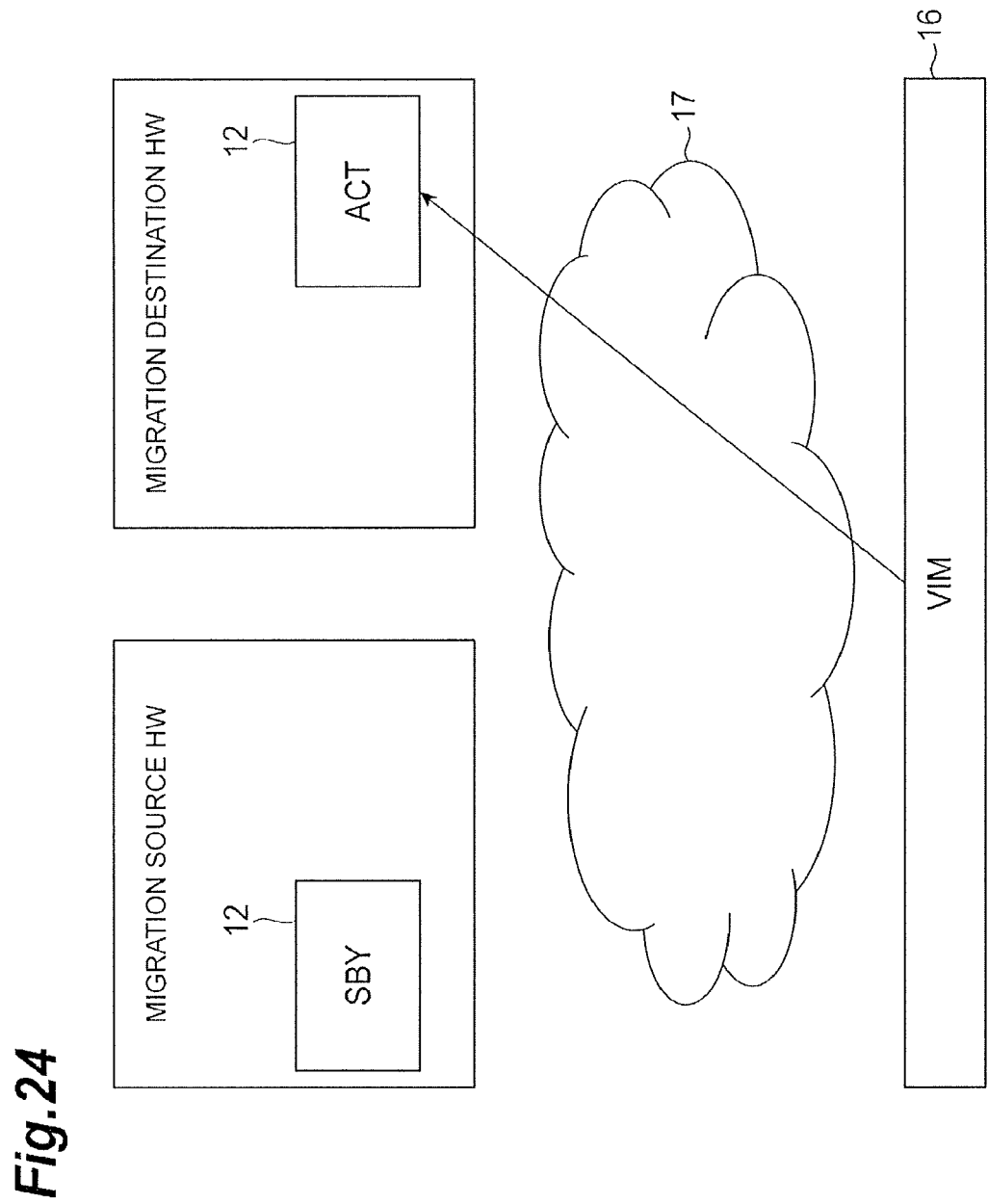
FIG. 24 is a diagram illustrating a third state of the NFV environment in the processing performed by the migration method 3.
Figure 25:
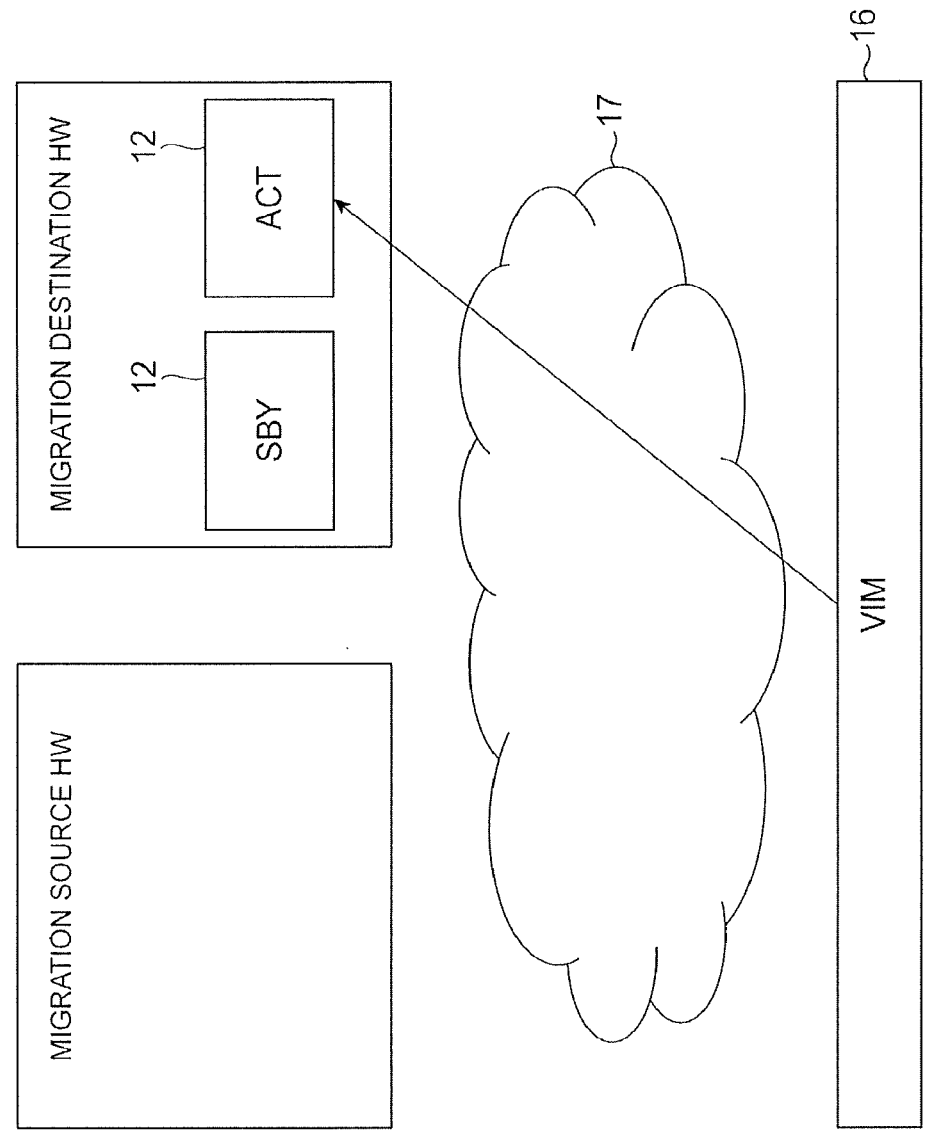
FIG. 25 is a diagram illustrating a fourth state of the NFV environment in the processing performed by the migration method 3.

Next, FIG. 23 illustrates a state in which, in the state illustrated in FIG. 22, the migration unit 22 of the VIM 16 has performed live migration of the SBY system VNF 12 on the migration source HW to the SBY system VNF 12 on the migration destination HW. Next, FIG. 24 illustrates a state in which, in the state illustrated in FIG. 23, the switching unit 23 of the VIM 16 has performed system switching between the ACT system VNF 12 on the migration source HW and the SBY system VNF 12 on the migration destination HW. FIG. 25 illustrates a state in which, in the state illustrated in FIG. 24, the migration unit 22 of the VIM 16 has performed live migration of the SBY system VNF 12 on the migration source HW to the SBY system VNF 12 on the migration destination HW.

In addition, in the case of N-ACT, live migration is executed once. In this case, a processor compatibility feature is required. In addition, the SBY system VNF 12 performs live migration.

Figure 26:
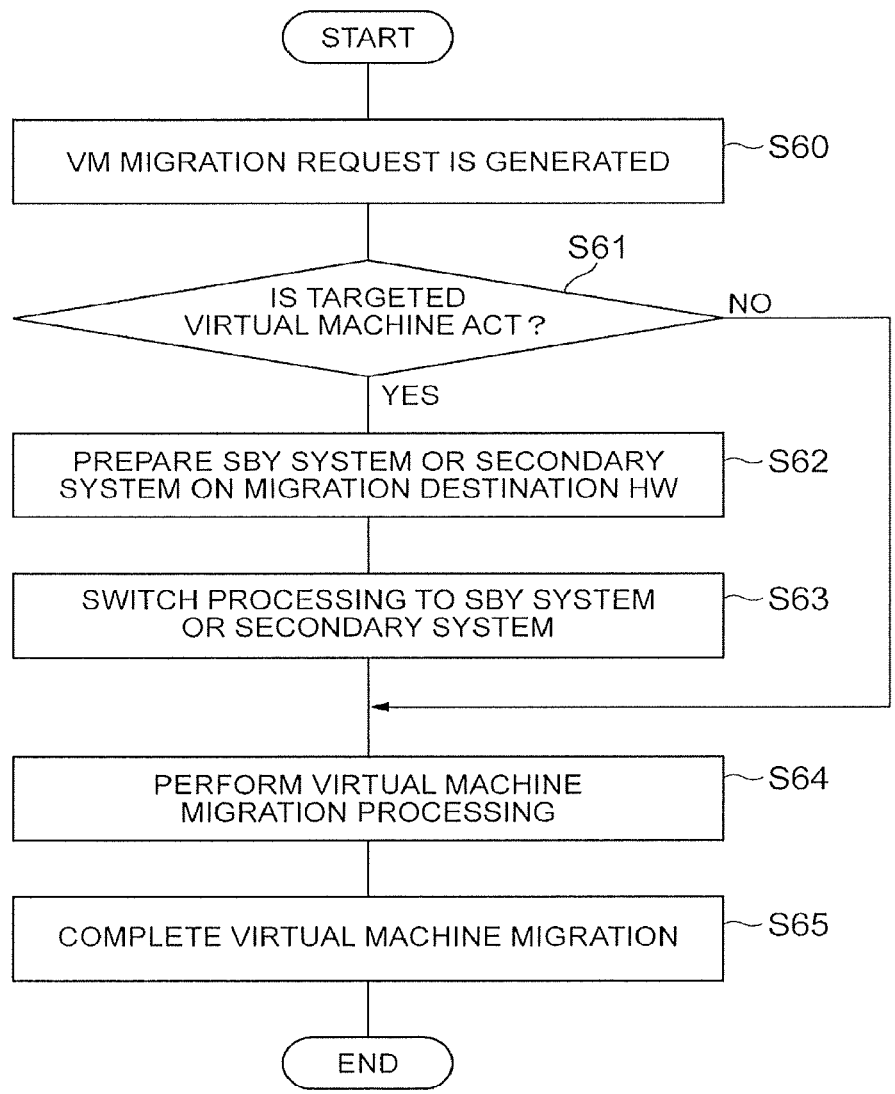
FIG. 26 is a flowchart illustrating virtual machine migration processing in a VIM according to the present embodiment.

Subsequently, virtual machine migration processing in the VIM 16 according to the present embodiment will be described using a flowchart illustrated in FIG. 26. First, in S60, a VM migration request is generated in the VIM 16. Next, in S61, it is determined in the VIM 16 whether a targeted virtual machine is an ACT system. If it is determined in S61 that the targeted virtual machine is an ACT system, in S62, the VIM 16 prepares a SBY system or a secondary system on the migration destination HW (expansion/removal, live migration, or the like). Next, in S63, the VIM 16 switches processing to the SBY system or the secondary system (system switching, network switching, or the like). Subsequently to S63, or if it is determined in S61 that the targeted virtual machine is not an ACT system, in S64, the VIM 16 performs virtual machine migration processing (expansion/removal, live migration, or the like). Next, in S65, the virtual machine migration is completed.

Next, the functional effect of the VIM 16 configured as described in the present embodiment will be described.

According to the VIM 16 of the present embodiment, switching from a virtual machine of a migration source to a virtual machine of a migration destination, or system switching between an ACT system virtual machine of a migration source and a SBY system virtual machine of a migration destination can be seamlessly performed with less influence on services. In short, a virtual machine can be seamlessly migrated with less influence on services in the NFV environment 1.

In addition, according to the VIM 16 of the present embodiment, for example, scaling out/in performed through network flow switching can be reliably achieved.

In addition, according to the VIM 16 of the present embodiment, for example, scaling out/in performed through system switching between the ACT system/SBY system can be reliably achieved.

In addition, according to the VIM 16 of the present embodiment, for example, live migration performed through system switching between the ACT system/SBY system can be reliably achieved.

In addition, according to the VIM 16 of the present embodiment, the orchestrator 14 for managing all the virtualized resources determines migratability of a virtual machine, and switching is performed in a migratable case. Thus, the virtual machine can be migrated more safely and reliably in the NFV environment 1.

As described above, according to the VIM 16 of the present embodiment, in the virtualization of communication services, seamless virtual machine migration can be achieved.

REFERENCE SIGNS LIST

1 NFV environment
10 OSS/BSS
11 NFVI
12 VNF
13 EMS
14 orchestrator
15 VNFM
16 VIM
20 migratability acquisition unit
21 expansion unit
22 migration unit
23 switching unit

The invention claimed is:

1. A virtualized resource management node for managing each virtualized resource that is included in a communication system including virtualized resources including a physical machine in which a virtual machine having a virtual communication function being a virtualized communication function is implemented, the virtualized resource management node comprising a circuitry configured to:
    migrate a Standby (SBY) system virtual machine of a migration source to a SBY system virtual machine of a migration destination through live migration, wherein the SBY system virtual machine of the migration source operates as a secondary system of an Active (ACT) system virtual machine of the migration source,
    switch a system between the ACT system virtual machine of the migration source and the migrated SBY system virtual machine of the migration destination that has been migrated by the circuitry, and
    migrate the switched SBY system virtual machine of the migration source to an SBY system virtual machine of the migration destination through live migration.

2. The virtualized resource management node according to claim 1, the circuitry further configured to add on a virtual machine of a migration destination,
    and to switch a network flow from the virtual machine of the migration source to the virtual machine of the migration destination that has been added on.

3. The virtualized resource management node according to claim 1, the circuitry further configured to add on a SBY system virtual machine of a migration destination,
    and to switch a system between the ACT system virtual machine of the migration source and the SBY system virtual machine of the migration destination that has been added on.

4. The virtualized resource management node according to claim 1,
    wherein the communication system further includes an overall management node for managing all virtualized resources,
    wherein the circuitry further configured to transmit a migration request for requesting migration of a virtual machine, to the overall management node, to receive, as a response thereto, migratability indicating availability/unavailability of migration of the virtual machine that has been determined in the overall management node based on a predetermined determination criterion, from the overall management node, and
    to perform the switching in a case in which the received migratability indicates that migration is available.

5. The virtualized resource management node according to claim 1,
    wherein the communication system further includes an overall management node for managing all virtualized resources, and
    wherein the circuitry further configured to perform the switching after the virtualized resource management node has transmitted a migration request for requesting migration of a virtual machine, to the overall management node, the overall management node having received the migration request has requested a service state change of a virtual machine of a migration source after checking a service state of the virtual machine of the migration source, and the virtualized resource management node has received a response from the virtual machine of the migration source of which a service state has been changed based on the request.

6. A virtual machine migration method executed by a virtualized resource management node for managing each virtualized resource that is included in a communication system including virtualized resources including a physical machine in which a virtual machine having a virtual communication function being a virtualized communication function is implemented, the virtual machine migration method comprising:
- migrating a Standby (SBY) system virtual machine of a migration source to a SBY system virtual machine of a migration destination through live migration, wherein the SBY system virtual machine of the migration source operates as a secondary system of an Active (ACT) system virtual machine of the migration source;
- switching a system between the ACT system virtual machine of the migration source and the migrated SBY system virtual machine of the migration destination; and
- migrating the switched SBY system virtual machine of the migration source to an SBY system virtual machine of the migration destination through live migration.

* * * * *